(12) United States Patent
Miyamoto

(10) Patent No.: US 9,503,380 B2
(45) Date of Patent: Nov. 22, 2016

(54) COMMUNICATION APPARATUS, COMMUNICATION METHOD, AND COMPUTER READABLE MEDIUM

(71) Applicant: NEC Corporation, Tokyo (JP)

(72) Inventor: Yoshinori Miyamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

(21) Appl. No.: 14/405,788

(22) PCT Filed: Jun. 4, 2013

(86) PCT No.: PCT/JP2013/065500
§ 371 (c)(1),
(2) Date: Dec. 5, 2014

(87) PCT Pub. No.: WO2013/183649
PCT Pub. Date: Dec. 12, 2013

(65) Prior Publication Data
US 2015/0117464 A1    Apr. 30, 2015

(30) Foreign Application Priority Data
Jun. 8, 2012  (JP) ................................. 2012-130998

(51) Int. Cl.
*H04L 12/859* (2013.01)
*H04L 29/08* (2006.01)
(Continued)

(52) U.S. Cl.
CPC ........... *H04L 47/2475* (2013.01); *H04L 47/56* (2013.01); *H04L 47/628* (2013.01); *H04L 47/6275* (2013.01); *H04L 67/2833* (2013.01)

(58) Field of Classification Search
CPC .................................................. H04L 47/2475
See application file for complete search history.

(56) References Cited

U.S. PATENT DOCUMENTS 6,754,191 B1 * 6/2004 Paranchych ...... H04W 36/0088
370/331
8,126,010 B2 * 2/2012 Haran .................... H04L 47/13
370/412
(Continued)

FOREIGN PATENT DOCUMENTS

EP           1601145 A2      11/2005
JP         2002-009832        1/2002
(Continued)

OTHER PUBLICATIONS

Extended European Search Report (EESR) dated Dec. 3, 2015; Appln. No. 13800582.2.
(Continued)

*Primary Examiner* — Anh-Vu Ly
*Assistant Examiner* — Abdullahi Ahmed
(74) *Attorney, Agent, or Firm* — Young & Thompson

(57) ABSTRACT

A communication apparatus is provided with: a transmission planned data storage unit in which a plurality of application data, each associated with transmission order information indicating a transmission order and with destination information indicating a destination terminal as a transmission destination are stored; a data aggregation unit that extracts a plurality of application data from the plurality of application data that are associated with mutually identical destination information, that extracts, on the basis of a maximum transmission size indicating an upper-limit value of data size and the transmission order information, a plurality of application data for aggregation from the plurality of extracted application data, and that generates aggregated data to which the identical destination information is allocated, on the basis of the plurality of application data for aggregation; and a data transmission unit that transmits the aggregated data to the destination terminal indicated by the allocated destination information.

19 Claims, 17 Drawing Sheets

(51) Int. Cl.
*H04L 12/875* (2013.01)
*H04L 12/865* (2013.01)
*H04L 12/863* (2013.01)

(56) References Cited

U.S. PATENT DOCUMENTS

| | | |
|---|---|---|
| 2001/0055317 A1 | 12/2001 | Kajizaki et al. |
| 2002/0032788 A1 | 3/2002 | Emanuel et al. |
| 2005/0122960 A1 | 6/2005 | Khan |
| 2006/0146853 A1* | 7/2006 | Paila .................... H04L 47/621 370/428 |
| 2006/0146868 A1* | 7/2006 | Ginzburg ............ H04L 12/5602 370/465 |
| 2008/0239957 A1* | 10/2008 | Tokura ................ H04L 12/5695 370/235 |
| 2010/0322074 A1 | 12/2010 | Nakahira |

FOREIGN PATENT DOCUMENTS

| | | | |
|---|---|---|---|
| JP | 2002-044151 | 2/2002 | |
| JP | 2005-311910 | 11/2005 | |
| JP | 2008-311942 | 12/2008 | |
| JP | 2009-212682 | 9/2009 | |
| JP | 4727977 | 7/2011 | |
| SE | WO 2011113475 A1 * | 9/2011 | .......... H04W 28/065 |
| WO | 2011113475 A1 | 9/2011 | |

OTHER PUBLICATIONS

International Search Report PCT/JP2013/065500 dated Aug. 13, 2013.

* cited by examiner

| | ALLOWABLE DELAY INFORMATION | TRANSMISSION PLANNED DATA | | |
|---|---|---|---|---|
| | ALLOWABLE DELAY TIME | IDENTIFIER OF DESTINATION TERMINAL | APPLICATION DATA | |
| | | | APPLICATION HEADER | APPLICATION BODY |
| DATA(1) | TIME A | TERMINAL A | AH1 | AB1 |
| DATA(2) | TIME B | TERMINAL B | AH2 | AB2 |
| DATA(3) | TIME C | TERMINAL C | AH1 | AB3 |

Fig.4

| IDENTIFIER OF DESTINATION TERMINAL | APPLICATION DATA | |
|---|---|---|
| | APPLICATION HEADER | APPLICATION BODY |
| TERMINAL A | AH1 | AB1 | AB3 |

AGGREGATED DATA

|  | TRANSMISSION PRIORITY DEGREE | IDENTIFIER OF DESTINATION TERMINAL | APPLICATION HEADER | APPLICATION BODY |
|---|---|---|---|---|
| DATA(1) | IMMEDIATE | TERMINAL A | AH1 | AB1 |
| DATA(2) | HIGH PRIORITY | TERMINAL A | AH1 | AB2 |
| DATA(3) | HIGH PRIORITY | TERMINAL A | AH1 | AB3 |
| DATA(4) | LOW PRIORITY | TERMINAL A | AH1 | AB4 |
| DATA(5) | LOW PRIORITY | TERMINAL A | AH1 | AB5 |

Fig.14

| | IDENTIFIER OF DESTINATION TERMINAL | TRANSMISSION PLANNED DATA | | | | | | |
|---|---|---|---|---|---|---|---|---|
| | | APPLICATION HEADER | | | APPLICATION BODY | | | |
| | | SEOJ (SIZE: 3BYTE) | DEOJ (SIZE: 3BYTE) | ESV (SIZE: 1BYTE) | EPC (SIZE: 1BYTE) | PDC (SIZE: 1BYTE) | EDT (SIZE: SIZE DESIGNATED BY PDC) |
| DATA(1) | 10. 10. 10. 10 | 0x05 FF01 | 0x02 7D01 | 0x60 | 0xE0 | 0x04 | 0x10 000000 (SIZE: 4BYTES) |
| DATA(2) | 20. 20. 20. 20 | 0x05 FE01 | 0x02 7901 | 0x61 | 0xE5 | 0x01 | 0x33 (SIZE: 1BYTE) |
| DATA(3) | 10. 10. 10. 10 | 0x05 FF01 | 0x02 7D01 | 0x60 | 0xD7 | 0x01 | 0x33 (SIZE: 1BYTE) |

Fig.15

| | ALLOWABLE DELAY TIME | TRANSMISSION PLANNED DATA | | | | | | | |
|---|---|---|---|---|---|---|---|---|---|
| | | DESTINATION IP ADDRESS | APPLICATION HEADER | | | APPLICATION BODY | | | |
| | | | SEOJ (SIZE: 3BYTES) | DEOJ (SIZE: 3BYTES) | ESV (SIZE: 1BYTE) | EPC (SIZE: 1BYTE) | PDC (SIZE: 1BYTE) | EDT (SIZE: SIZE DESIGNATED BY PDC) |
| DATA(d1) | 12:00 | 10.10.10.10 | 0x05 FF01 | 0x02 7D01 | 0x60 | 0xE0 | 0x04 | 0x10 000000 (SIZE: 4BYTES) |
| DATA(d2) | 13:00 | 20.20.20.20 | 0x05 FE01 | 0x02 7901 | 0x61 | 0xE5 | 0x01 | 0x33 (SIZE: 1BYTE) |
| DATA(d3) | 12:30 | 10.10.10.10 | 0x05 FF01 | 0x02 7D01 | 0x60 | 0xD7 | 0x01 | 0x00 (SIZE: 1BYTE) |
| DATA(d4) | 13:00 | 10.10.10.10 | 0x05 FF01 | 0x02 7D01 | 0x60 | 0xD9 | 0x01 | 0x00 (SIZE: 1BYTE) |

Fig. 16

| DESTINATION IP ADDRESS | AGGREGATED DATA | | | | | | | | | | | | |
|---|---|---|---|---|---|---|---|---|---|---|---|---|
| | APPLICATION HEADER | | | APPLICATION BODY | | | | | | | | |
| | SEOJ | DEOJ | ESV | EPC | PDC | EDT | EPC | PDC | EDT | EPC | PDC | EDT |
| 10.10.10.10 | 0x05 FF01 | 0x02 7D01 | 0x60 | 0xE0 | 0x04 | 0x10 000000 (SIZE: 4BYTES) | 0xD7 | 0x01 | 0x00 (SIZE: 1BYTE) | 0xD9 | 0x01 | 0x00 (SIZE: 1BYTE) |

COMMUNICATION APPARATUS, COMMUNICATION METHOD, AND COMPUTER READABLE MEDIUM

TECHNICAL FIELD

The present invention relates to a communication apparatus, communication system, communication method and a computer readable medium.

BACKGROUND ART

In recent years, in order to realize a smart house and M2M (Machine to Machine), there have been advanced research, development, and demonstration experiments of energy management based on remote supervision or remote control for home electric appliances and energy-related devices such as a solar power generation system and a storage battery. As a gateway device, between an external remote supervision • control server (hereinafter, referred to as just an external server) and in-home devices, a smart meter and a HEMS (Home Energy Management System) are mentioned. The external server sends an instruction to the smart meter or the HEMS via various communication media, and thereby, controls each of the devices.

As a device control performed by the external server, there are a restriction instruction regarding a generated power output of a solar power generation system and a specification of a charge and discharge amount of a storage battery. Each control instruction is constituted with an identifier of a control target, a cord indicating a generated power amount/charging or discharging of power, information indicating the content of an instruction to each code, and the like. The size of the control instruction is very small. For example, in ECHONET (registered trademark (omitted hereinafter); Energy Conservation and Homecare Network), a message format regarding storage battery control is specified. Data sizes in the message format are mostly 10 to 20 bytes.

As a communication medium for connecting between an external server and a consumer, it is considered to utilize a minimal band of around 100 bytes. Thus, an efficient use of such a limited communication band is required. At present, however, an external server transmits a plurality of kinds of control instructions to a consumer at a corresponding timing specified to each instruction. Thus, instructions having a small data size as described above flow on a narrow-band communication medium.

In the case where a large number of control instructions are communicated, there is a packet aggregation technology as one of technologies for improving data transmission efficiency. In this technology, a plurality of data are not transmitted as separate packets, but are transmitted in the form of, for example, a single packet into which the plurality of data are aggregated and contained.

According to this technology, it becomes possible to communalize a header area appended to a head portion of each of packets. Through this communalization of the header area, it is possible to efficiently utilize a bandwidth.

An example of such a technology is disclosed in PTL 1 and PTL 2.

In a technology disclosed in PTL 1, when an aggregated packet is generated, a size of the aggregated packet is dynamically changed. By this way, packet aggregation jitters and delay of a first aggregated packet can be reduced when voice data or the like is transmitted, In a technology disclosed in PTL 2, a header portion is communalized when tunneling packets. That is, in the technology disclosed in PTL 2, when a large volume of data representing moving images or voice signals is transmitted, RTF (Real-time Transport Protocol) packets are encapsulated by using HTTP (HyperText Transfer Protocol). In this case, by communalizing header portions of the aggregated RTF packets, overhead due to the packet header is reduced.

CITATION LIST

Patent Literature

[PLT 1] Japanese Patent No. 4727977
[PLT 2] Japanese Patent Application Laid-Open No. 2008-311942

SUMMARY OF INVENTION

Technical Problem

In such technologies disclosed in PTL 1 and PTL 2, when a plurality of transmission data are aggregated, individual transmission planned data are transmitted with no delay. In this method, for example, in data communication in such control of in-home devices by an external server as described above, there is a problem that there is a case in which an aggregated data for a desired size is not efficiently generated. In this case, an application which performs control attempts to transmit control data randomly. Thus, when attempting to aggregate all data with no delay, there is a case in which data for aggregation cannot be sufficiently secured and an aggregated data having a desired size cannot be generated. This is because even any control data whose delay is allowed is attempted to be aggregated with no delay.

The present invention has been made in view of such a situation as described above. An example of objects of the present invention is to provide a communication apparatus, communication system, a communication method and a computer readable medium which are capable of solving the aforementioned problem.

Solution to Problem

In order to solve the above problems, a communication apparatus according to an exemplary embodiment of the present invention includes: a transmission planned data storage unit which stores a plurality of application data each associated with transmission order information indicating a transmission order and destination information indicating a destination terminal as a transmission destination: a data aggregation unit which extracts a plurality of application data, which are mutually associated with identical destination information, from the plurality of application data, extracts a plurality of application data targeted for aggregation from the plurality of extracted application data on the basis of a maximum transmission size indicating an upper limit value of a data size and the transmission order information, and generates an aggregated data to which the identical destination information is allocated on the basis of the plurality of application data targeted for aggregation; and a data transmission unit which transmits the aggregated data to a destination terminal indicated by the allocated destination information.

A communication system according to an exemplary embodiment of the present invention includes: a first communication terminal; and a second communication terminal.

The first communication terminal includes: a transmission planned data storage unit which stores a plurality of application data each associated with transmission order information indicating a transmission order and destination information indicating a destination terminal as a transmission destination; a data aggregation unit which extracts a plurality of application data, which are mutually associated with identical destination information, from the plurality of application data, extracts a plurality of application data targeted for aggregation from the plurality of extracted application data on the basis of a maximum transmission size indicating an upper limit value of a data size and the transmission order information, and generates an aggregated data to which the identical destination information is allocated on the basis of the plurality of application data targeted for aggregation; and a data transmission unit which transmits the aggregated data to a destination terminal indicated by the allocated destination information. The second communication terminal comprising: a data reception unit which receives the aggregated data transmitted by the data transmission unit; and a data analysis unit which analyzes and disaggregates the aggregated data.

A communication method according to an exemplary embodiment of the present invention includes; referring to a transmission planned data storage unit which stores a plurality of application data each associated with transmission order information indicating a transmission order and destination information indicating a destination terminal as a transmission destination; extracting a plurality of application data, which are mutually associated with identical destination information from the plurality of application data stored in the transmission planned data storage unit; extracting a plurality of application data targeted for aggregation from the plurality of extracted application data on the basis of a maximum transmission size indicating an upper limit value of a data size and the transmission order information: generating an aggregated data to which the identical destination information is allocated on the basis of the plurality of application data targeted for aggregation: and transmitting the aggregated data to a destination terminal indicated by the allocated destination information.

A computer readable non-transitory recording medium according to an exemplary embodiment of the present invention embodying a program, the program causing a computer to perform a method, the method includes: referring to a transmission planned data storage unit which stores a plurality of application data each associated with transmission order information indicating a transmission order and destination information indicating a destination terminal as a transmission destination; extracting a plurality of application data, which are mutually associated with identical destination information, from the plurality of application data stored in the transmission planned data storage unit; extracting a plurality of application data targeted for aggregation from the plurality of extracted application data on the basis of a maximum transmission size indicating an upper limit value, of a data size and the transmission order information; generating an aggregated data to which the identical destination information is allocated, on the basis of the plurality of application data targeted for aggregation; and transmitting the aggregated data to a destination terminal indicated by the allocated destination information.

Advantageous Effects of Invention

According to the present invention, for example, even when data whose delay is allowed to some extent and data whose delay is desired to be reduced as much as possible occur in this description order, it becomes possible to aggregate the data appropriately regardless of occurrence order thereof.

BRIEF DESCRIPTION OF DRAWINGS

FIG. 15 A diagram illustrating an example of transmission planned data stored in a transmission planned data storage unit for a description of an operation according to the first exemplary embodiment of the present invention.

FIG. 16 A diagram illustrating an example of aggregated data for a description of an operation according to the first exemplary embodiment of the present invention FIG. 17 A diagram illustrating a fundamental exemplary embodiment of the present invention

DESCRIPTION OF EMBODIMENTS

Hereinafter, exemplary embodiments of the present invention will be described with reference to the drawings. One of the features of a communication system of these exemplary embodiments is to reduce a load on a network by aggregating data in accordance with classes of data.

In the present invention, when application data desired to be transmitted is generated, the application data can be stored in a transmission planned data storage unit once as a transmission planned data. In that case, the application data is stored so as to be associated with a transmission order information indicating the earlier or later of transmission order of the application data and a destination information indicating a destination terminal of the application data. An aggregated data is generated by extracting a plurality of transmission planned data whose respective destination information is identical from the transmission planned data storage unit and combining the extracted transmission planned data in accordance with transmission order information. That is, according to the present invention, it becomes possible to perform data aggregation in accordance with transmission order information indicating the earlier or later of transmission order of the application data. Accordingly, for example, even when data whose delay is allowed to some extent and data whose delay is desired to be reduced as much as possible have occurred in this description order, it becomes possible to aggregate each of these data in order appropriate irrespective of occurrence order thereof.

Figure 1:
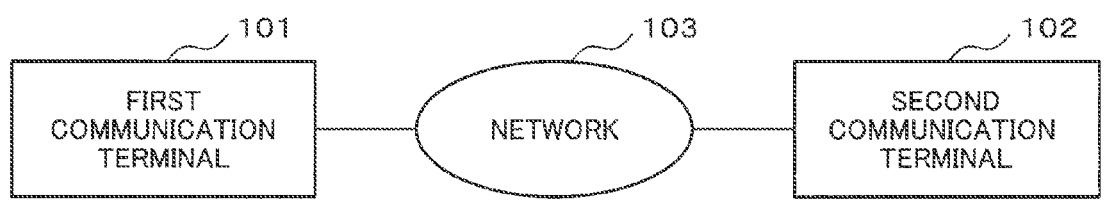
FIG. 1 A diagram illustrating a configuration of a communication system according to a first exemplary embodiment of the present invention FIG. 2 A diagram illustrating a configuration of a first communication terminal according to the first exemplary embodiment of the present invention FIG. 3 A diagram illustrating an example of data stored in a transmission planned data storage unit according to the first exemplary embodiment of the present invention FIG. 4 A diagram illustrating an example of aggregated data according to the first exemplary embodiment of the present invention FIG. 5 A diagram illustrating a configuration of a second communication terminal according to the first exemplary embodiment of the present invention FIG. 6 A flowchart regarding internal operation of the first communication terminal according to the first exemplary embodiment of the present invention FIG. 7 A flowchart regarding an example of an aggregation method according to the first exemplary embodiment of the present invention FIG. 8 A flowchart regarding internal operation of the second communication terminal according to the first exemplary embodiment of the present invention FIG. 9 A diagram illustrating a configuration of a first communication terminal according to a second exemplary embodiment of the present invention FIG. 10 A diagram illustrating an example of a transmission queue according to the second exemplary embodiment of the present invention FIG. 11A A diagram for describing an example of an aggregation method according to the second exemplary embodiment of the present invention FIG. 11B A diagram for describing an example of an aggregation method according to the second exemplary embodiment of the present invention FIG. 12 A flowchart regarding an example of an aggregation method according to the second exemplary embodiment of the present invention FIG. 13 A flowchart regarding an example of an aggregation method according to the second exemplary embodiment of the present invention FIG. 14 A diagram illustrating an example of transmission planned data for a description of an operation according to the first exemplary embodiment of the present invention.

A block diagram of a communication system according to a first exemplary embodiment of the present invention is shown in FIG. 1. Referring to FIG. 1, a communication system 100 of the first exemplary embodiment includes a first communication terminal (a communication terminal at a transmitting side) 101 and a second communication terminal (a communication terminal at a receiving side) 102. The first communication terminal 101 and the second communication terminal 102 are connected via a network 103. FIG. 1 is an example of a configuration of the communication system 100, and the configuration of the communication system 100 is not limited to this. That is, the communication system 100 may include, for example, equal to or more than two of the first communication terminals 101 and equal to or more than two of the second communication terminals 102.

The first communication terminal 101 is a terminal for sending messages to the second communication terminal 102 via the network 103. For example, the first communication terminal 101 is a communication apparatus, such as a server or a mobile terminal. The first communication terminal 101 stores data representing an identifier of the terminal itself in a predetermined storage unit which is not illustrated.

The second communication terminal 102 is a terminal for receiving messages from the first communication terminal 101 via the network 103. For example, the second communication terminal 102 is a communication apparatus, such as a server or a mobile terminal.

The second communication terminal 102 stores data representing its own terminal identifier in a predetermined storage unit which is not illustrated.

The network 103 is a communication network for transmitting messages. For example, the network 103 is a communication network, such as a network for power-line carrier communication, a mobile telephone network or an optical communication network.

In addition, in the communication system shown in FIG. 1, the first communication terminal 101 and the second communication terminal 102 correspond to, for example, the gateway device between the external server and the in-home devices, and the external serve described above as a background art.

Figure 2:
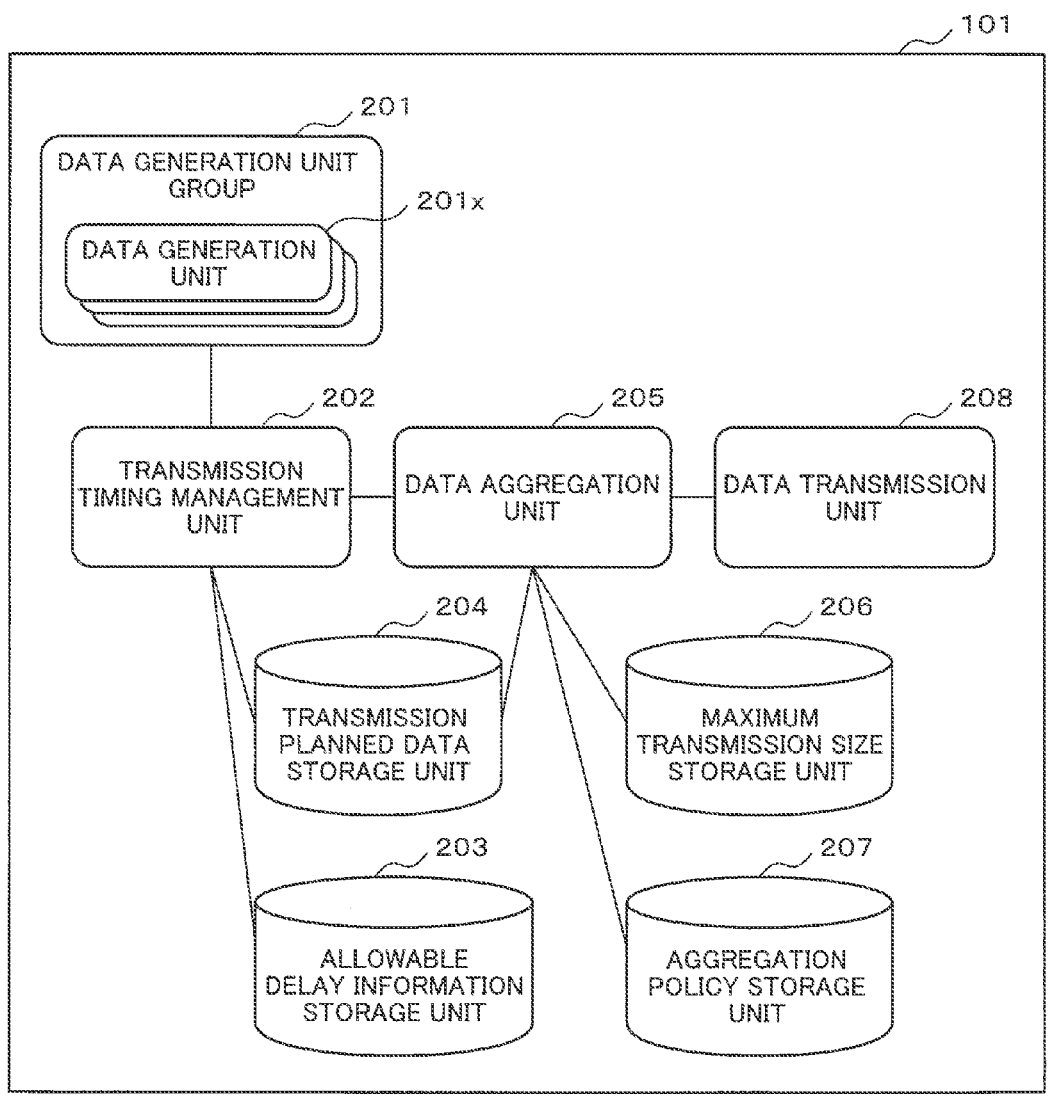

An example of a configuration of the first communication terminal 101 is shown in FIG. 2. The first communication terminal 101 includes data generation unit group 201, a transmission timing management unit 202, an allowable delay information storage unit 203, a transmission planned data storage unit 204, a data aggregation unit 205, a maximum transmission size storage unit 206, an aggregation policy storage unit 207 and a data transmission unit 208.

The data generation unit group 201 includes at least one data generation unit 201x. Each data generation unit 201x generates an application data at individual timing. Moreover, the each data generation unit 201x associates a transmission planned data, which includes the application data and an identifier of a destination terminal (in this example, the second communication terminal 102), with an own identifier, and transfers it to the transmission timing management unit 202. Specifically, the data generation unit 201x is an application program which is written in a programming language, such as C language, Java (registered trademark) or JavaScript (registered trademark).

The application data included in the transmission planned data includes an application header and an application body. The application header includes a class of the application and an identifier of the application. More specifically, the application header corresponds to an object code or a service class code in ECHONET or a message header in HTTP (Hypertext Transfer Protocol). The application body includes information related to the processing content of the application. More specifically, the application body corresponds to a property cord, ECHONET data in ECHONET, or a message body in HTTP.

The identifier of the destination terminal corresponds to, for example, an IP (Internet Protocol) address of the destination terminal or a host name of the destination terminal.

The transmission timing management unit 202 receives the transmission planned data and the identifier of the data generation unit 201x from the data generation unit group 201. The transmission timing management unit 202 acquires allowable delay information related to the data generation unit 201x from the allowable delay information storage unit 203. The transmission timing management unit 202 monitors transmission timing of each of the transmission planned data on the basis of the allowable delay information related to each of the data generation unit 201x. The transmission timing management unit 202 associates the transmission planned data with the allowable delay information or allowable delay information which is newly generated on the basis of this information, and records it into the transmission planned data storage unit 204. The transmission timing management unit 202 instructs the data aggregation unit 205 to begin aggregation of data when receiving the transmission planned data from the data generation unit group 201, when determining that the transmission planned data is in transmission timing; or at predetermined intervals.

The allowable delay information is information related to a delay which is allowed for the transmission planned data. Specifically, the allowable delay information corresponds to a relative delay time which is allowed from the time of a reception of data from the data generation unit 201x, or an allowable degree of delay. A specific example of the allowable degree of delay is an immediate transmission, the height of a transmission priority degree, or the like. That is, the allowable delay information associated with the application data is information which indicates the earlier or later of transmission order of the application data relative to transmission order of other application data.

The allowable delay information is acquired from the allowable delay information storage unit 203 by using the identifier of the target generation unit 201x as a search key.

The allowable delay information which is newly generated on the basis of the allowable delay information corresponds to, for example, an absolute time which is calculated on the basis of the relative delay time. As a method for calculating this absolute time, a method of making a value adding the relative delay time to a time at which a transmission planned data is received from the data generation unit 201x the absolute time may be used.

The allowable delay information storage unit 203 stores the allowable delay information and the identifier of the data generation units 201x such that they are associated with each other. In response to a request from the transmission timing management unit 202, the allowable delay information storage unit 203 transfers the corresponding allowable delay information to the transmission timing management unit 202.

The transmission planned data storage unit 204 receives the transmission planned data from the transmission timing management unit 202. The transmission planned data storage unit 204 stores the transmission planned data. In this case, the transmission planned data storage unit 204 associates the a plurality of the application data included in the transmission planned data which is received from the transmission timing management unit 202 with information indicating the earlier or later of transmission order and information indicating the destination terminal of the application data, and stores them as the transmission planned data. The information indicating the earlier or later of transmission order is information indicating the earlier or later of transmission order of the application data included in the received transmission planned data relative to the other application data. Moreover, in response to a request from the data aggregation unit 205, the transmission planned data storage unit 204 transmits the corresponding transmission planned data to the data aggregation unit 205.

An example of a transmission planned data which is stored in the transmission planned data storage unit 204 is shown in FIG. 3.

The transmission planned data storage unit 204 stores the allowable delay information (including the allowable delay time) and the transmission planned data (including the identifier of the destination terminal and the application data) such that they are associated with each other. For example, data (1) stores "time A" as the allowable delay time of the allowable delay information, "terminal A" as the identifier of the destination terminal, "AH1" as the application header, and "AB1" as the application body. Similarly, data (2) stores "time B" as the allowable delay time of the allowable delay information, "terminal B" as the identifier of the destination terminal, "AH2" as the application header, and "AB2" as the application body. Data (3) stores "time C" as the allowable delay time of the allowable delay information, "terminal A" as the identifier of the destination terminal, "AH1" as the application header, and "AB3" as the application body.

The data aggregation unit 205 receives an instruction for aggregation of the transmission planned data from the transmission timing management unit 202. The data aggregation unit 205 acquires all data from the transmission planned data storage unit 204. The data aggregation unit 205 acquires a maximum transmission size of the application body from the maximum transmission size storage unit 206. The data aggregation unit 205 acquires an aggregation policy from the aggregation policy storage unit 207. The data aggregation unit 205 aggregates the transmission planned data in view of the allowable delay time of the transmission planned data and the maximum transmission size with considering the aggregation policy. A method for generating the aggregated data will be described below. The data aggregation unit 205 transfers the sendable aggregated data to the data transmission unit 208.

The maximum transmission size storage unit 206 stores the maximum size of the transmitted application body. Moreover, the maximum transmission size storage unit 206 transfers the maximum transmission size to the data aggregation unit 205 in response to a request, from the data aggregation unit 205. The maximum transmission size is information indicating a maximum size in aggregation as one aggregated data. In this exemplary embodiment, the maximum transmission size storage unit 206 stores information indicating a maximum size of the application body when transmitting. This exemplary embodiment is not limited to this. The maximum transmission size storage unit 206 may be information indicating a maximum size of the whole of the aggregated data in aggregation as a single data or information which includes the application header and the like in addition to the application body when transmitting.

The aggregation policy storage unit 207 stores the aggregation policy. In response to a request from the data aggregation unit 205, the aggregation policy storage unit 207 transfers the aggregation policy to the data aggregation unit 205.

The aggregation policy is information for prescribing an aggregation method for aggregating the transmission planned data. The aggregation method represented by the aggregation policy is a method which is prescribed on the basis of at least one constituent element of the transmission planned data, and which is prescribed in view of a data analysis method (below-mentioned) performed by the second communication terminal 102.

A specific example of the aggregation policy will be described on the basis of the transmission planned data shown in FIG. 3. The aggregation policy in this example includes [Procedure 1] and [Procedure 2] described blow.

[Procedure 1]: To select the transmission planned data which are the transmission planned data whose identifier of the destination terminal and the application header are identical to each other.

[Procedure 2]: To aggregate the application body by communalizing the identifier of the destination terminal and the application header which are included in the transmission planned data selected in [Procedure 1].

The aggregated data generated in this case is shown in FIG. 4. This aggregated data is the aggregated data generated by using data (1) and data (3) shown in FIG. 3. Thus, the aggregated data shown in FIG. 3 becomes the aggregated data which communalizes the identifier "Terminal A" of the destination terminal and the application header "AH1", and has "AB1" and "AB3" as the application body.

This aggregation policy is prescribed in view of the data analysis method of the second communication terminal 102. A specific example of this data analyzing method is as follows.

A data processing unit 505x (below-mentioned) at the receiving terminal side is determined by the application header.

The method is to be such that, after disaggregating the application body of the aggregated data into a plurality of pre-aggregation application bodies, these application bodies are able to be transferred to the above-mentioned data processing unit 505x.

An example of a case where the aggregated data can be disaggregated includes a case where a data size of simple pre-aggregation application body is written in prescribed number of bytes of front portion of the application body. The data processing unit 505x at the receiving side disaggregates the aggregated data into a plurality of pre-aggregation application bodies in accordance with the data sizes.

The data transmission unit 208 receives the aggregated data from the aggregation unit 205. The data transmission unit 208 transmits the aggregated data to the second communication terminal 102. A specific example of the operation in which the data transmission unit 208 transmits the aggregated data includes generating an IP packet on the basis of the aggregated data. In this case, the data transmission unit 208 adds the application header and a header for communication to the aggregated data as needed. A specific example of the added application header includes a transaction ID (IDentifier) in ECHONET. A specific example of the header for communication includes an IP header or a UDP (Use Datagram Protocol) header.

Figure 5:
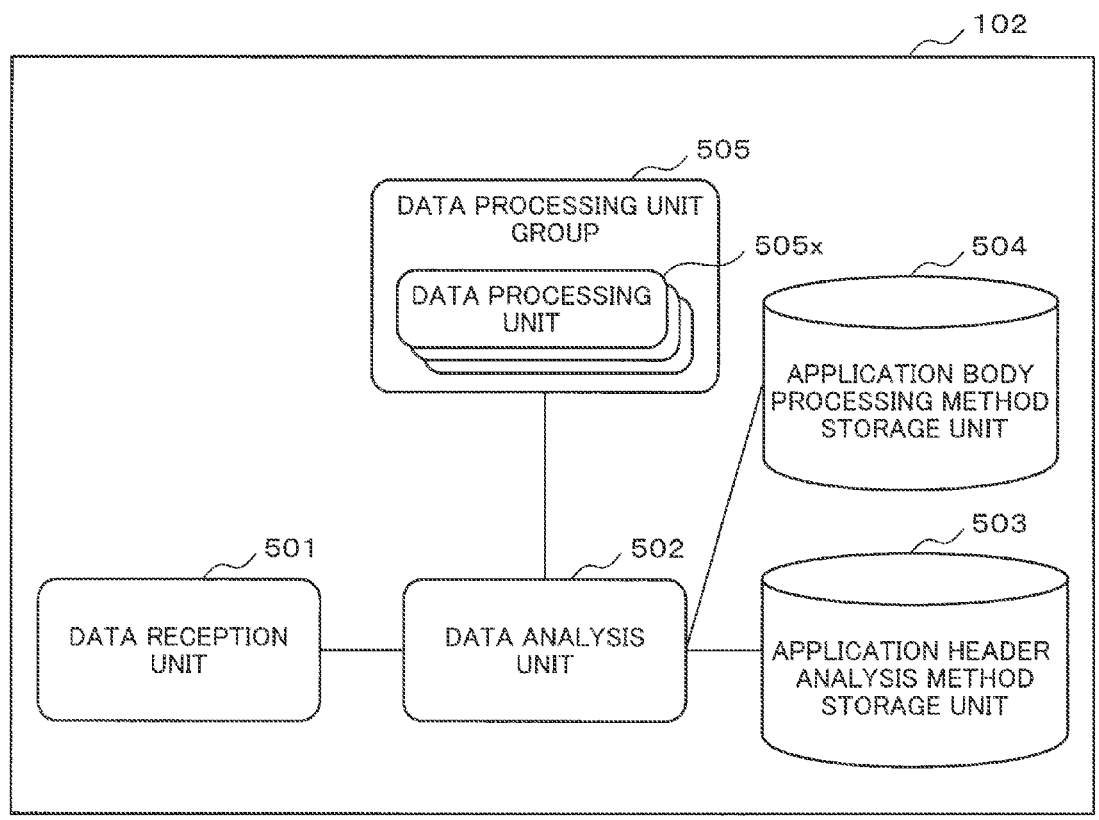

An example of a configuration of the data second communication terminal 102 is shown in FIG. 5. The data second communication terminal 102 includes a data reception unit 501, a data analysis unit 502, an application header analysis method storage unit 503, an application body processing method storage unit 504 and a data processing unit group 505.

The data reception unit 501 receives data from the first communication terminal 101. The data reception unit 501 extracts an aggregated data from the data. The data reception unit 501 transfers the aggregated data to the data analysis unit 502. Extracting the aggregated data means extracting data to be executed by the application by removing the header for communication.

The data analysis unit 502 receives the aggregated data from the data reception unit 501. The data analysis unit 502 acquires information which associates the application header with a data processing unit 505x from the application header analysis method storage unit 503. The data analysis unit 502 receives information related to a processing method for the application body from the application body processing method storage unit 504. The data analysis unit 502 disaggregates the application body into process able units on the basis of the information related to the processing method for the application body. The data analysis unit 502 transfers all information disaggregated into processable units to the data processing unit 505x which is included in the data processing unit group 505 and identified from the application header.

The information related to a processing method for the application body is information indicating a method for disaggregating the application body into processable units. A specific example of the information related to the processing method for the application body is information which includes information indicating where information representing the disaggregated units of the application body are set, and information indicating how the application body is disaggregated by using the information representing the disaggregated units. An example of the information indicating where information representing the disaggregated units of the application body are set may be information informing that a processable data size is written into a value in a predetermined number of bytes from the front of the application body. An example of the information indicating how the application body is disaggregated may be information informing that data of the above data sizes is extracted from the front of the application body as the processable unit, and further, this process is repeated until, the application body is gone. In this case, the data analysis unit 502 extracts data from the front of the application body to the data size which are written in here as the processable units. Further, the data analysis unit 502 repeats this process until the application body is gone.

The application header analysis method storage unit 503 stores information which associates the application header with the data processing unit 505x. In response to a request from the data analysis unit 502, the application header analysis method storage unit 503 transfers related information to the data analysis unit 502.

The application body processing method storage unit 504 stores information related to the method for disaggregating the application body into processable units. Moreover, in response to a request from the data analysis unit 502, the application body processing method storage unit 504 transfers information related to the processing method.

The data processing unit group 505 includes at least one data processing unit 505x. The each data processing unit 505x receives data from the data analysis unit 502. The each data processing unit 505x performs processing on the basis of a prescribed method. A specific example of the prescribed data processing method in the each data processing unit 505x include recording individual information into a DB (data base), transmitting information to a different terminal, and determining a return of a reply to a transmission source terminal. A specific example of this each data processing unit 505x include ECHONET application in ECHONET and a server side application such as a servlet and a PHP (hypertext Preprocessor) in HTTP.

Figure 6:
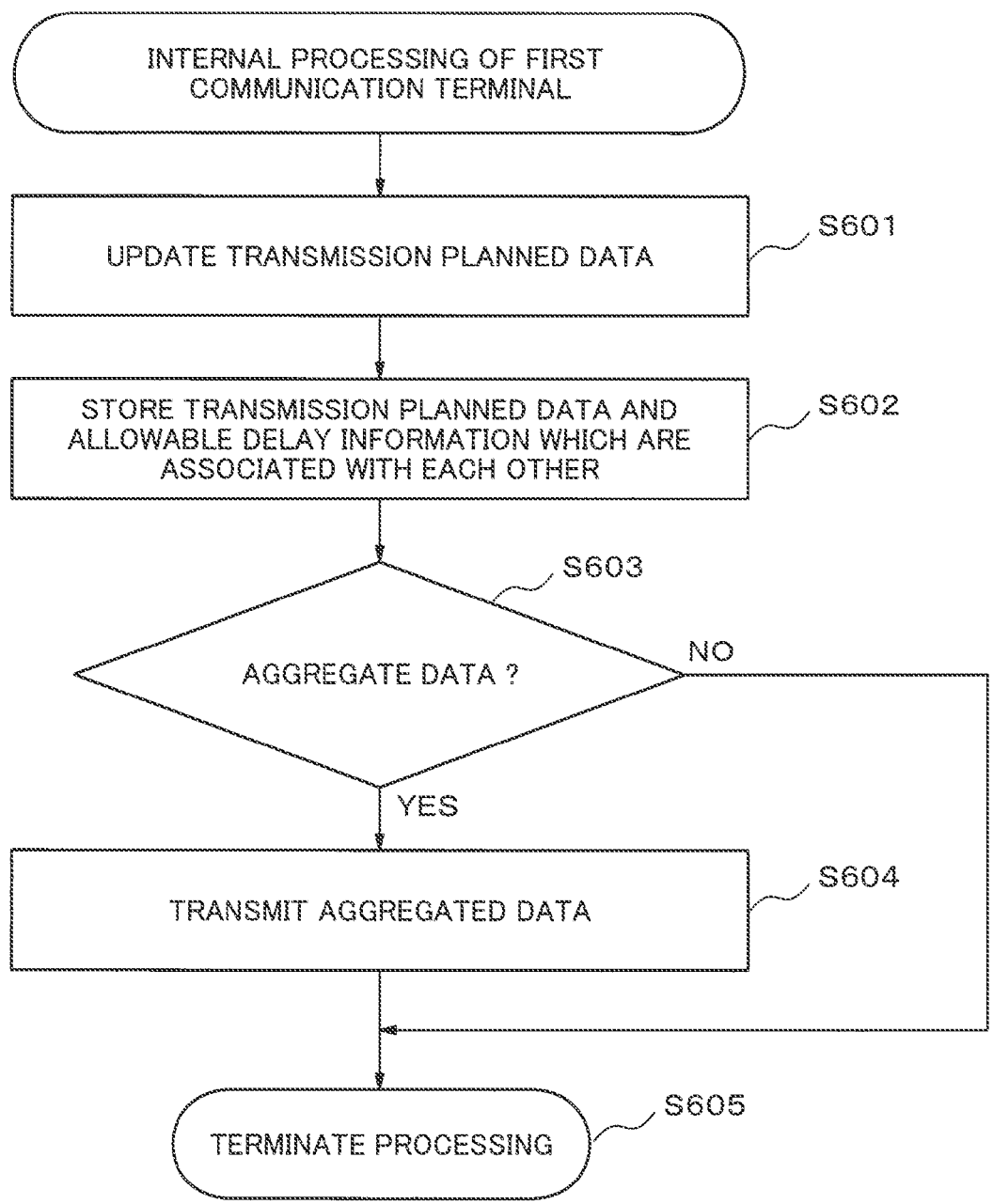

Next, the whole operation of the first exemplary embodiment will be described in detail on the basis of a flowchart. The internal operation of the first communication terminal 101 is shown in FIG. 6. The transmission timing management unit 202 of the first communication terminal 101 receives the transmission planned data and the identifier of the data generation unit 201x from the data generation unit group 201. Moreover, the transmission timing management unit 202 acquires the allowable delay information related to the data generation unit 201x from the allowable delay information storage unit 203. Then, the transmission timing management unit 202 updates the transmission planned data which become a target for processing in step S602, such as storage processing (step S601). Next, the transmission timing management unit 202 associates the transmission planned data with the allowable delay information, and stores them into the transmission planned data storage unit 204 (step S602). Next, in response to an instruction from the transmission timing management unit 202, the data aggregation unit 205 generates the aggregated data from the transmission planned data which is currently accumulated in the transmission planned data storage unit 204 when aggregatable transmission planed data exists in view of allowable delay information related to the transmission planned data, information related to the aggregation method and the maximum transmission size (details are described below) (step S603). When the data aggregation unit 205 determines that it is possible to generate a sendable aggregated data (step S603; Yes), the processing proceeds to step S604. When the data aggregation unit 205 determines that it is impossible to generate a sendable aggregated data (step S603: No), the processing proceeds to step S605. Next, when receiving the aggregated data from the data aggregation unit 205, the data transmission unit 208 transmits the received aggregated data (step S604). The first communication terminal 101 terminates this processing here (step S605).

As specific examples of processing in step S603, that is, specific examples of the aggregation processing performed by the data aggregation unit 205, three types of the aggregation method will be each described as aggregation methods A, B and C. As a premise for description of each of the aggregation methods, the following situations are assumed as the aggregation policy and the maximum transmission size. That is, in this assumption, the maximum transmission size is assumed to be ABmax. The aggregation policy in this assumption includes the following [Procedure 1A] and [Procedure 2A].

[Procedure 1A]: Extracting the transmission planned data which communizes the identifier of the destination terminal and the application header.

[Procedure 2A]: Communizing the identifier of the destination terminal and the application header included in the transmission planned data which satisfies [Procedure 1A], and assuming data aggregated the application bodies as the aggregated data.

First, the aggregation method A will be described with reference to FIG. 7.

Step A-11: According to [Procedure 1A] of the aggregation policy, the data aggregation unit 205 groups the transmission planned data which has the common identifier of the destination terminal and the common value of the application header by referring to the transmission planned data storage unit 204.

Step A-12: The data aggregation unit 205 determines whether or not there is a group which should be grouped. When the data aggregation unit 205 determines that there is a group which should be grouped (step A-12: Yes), the processing proceeds to step A-21. When the data aggregation unit 205 determines that there is no group which should be grouped (step A-12: No), the process terminates.

Step A-21: The data aggregation unit 205 selects any one group among groups grouped in step A-11. In step A-21, the data aggregation unit 205 makes a group which is unprocessed in step A-31 described below a target for the selection. That is, in step A-21, the data aggregation unit 205 selects a group which is different from groups selected in the past.

Step A-22: The data aggregation unit 205 determines whether or not there is a group which is unprocessed. When the data aggregation unit 205 determines that there is a group which is unprocessed (step A-22: Yes), the processing proceeds to step A-31. When the data aggregation unit 205 determines that there is no group which is unprocessed (step A-22: No), the process terminates.

Step A-31: The data aggregation unit 205 extracts and selects the transmission planned data of which the allowable delay time is designated at a current time among the transmission planned data belonging to the group selected in step A-21.

Step A-32: The data aggregation unit 205 determines whether or not there is the transmission planned data of which the allowable delay time is designated at a current time. When the data aggregation unit 205 determines that there is the transmission planned data of which the allowable delay time is designated at a current time (step A-32: Yes), the processing proceeds to step A-41. When the data aggregation unit 205 determines that there is no transmission planned data of which the allowable delay lime is designated at a current time (step A-32: No), the process returns to step A-21. Here, the extracted transmission planned data is the transmission planned data which is determined to need to be transmitted immediately.

Step A-41: The data aggregation unit 205 calculates an aggregation efficiency E, a transmission priority degree Q and an aggregation appropriateness degree A with all combination patterns of aggregated data, which includes the transmission planned data selected in step A-31 and other transmission planned data. The data aggregation unit 205 determines the aggregated data to be transmitted on the basis of these the aggregation efficiency E, the transmission priority Q and the aggregation appropriateness degree which are calculated. However, the aggregated data to be transmitted is finally determined after the completion of the calculation processing of the aggregation appropriateness degree A in step A-41 on the basis of all transmission planned data selected in step A-31.

The calculation processing in step A-41 will be described below by illustrating a specific example. In this example, it is assumed that the sizes of the application bodies of the transmission planned data which is determined as a certain combination pattern are AB1, AB2, . . . , and ABn respectively, and the size of the application body of the transmission planned data which is selected in step A-31 is AB0. In this case, the aggregation efficiency E is calculated as follows.

The aggregation efficiency E can be calculated by using Formula (2) with respect to a target combination pattern of transmission planned data which satisfy Formula (1).

$$(AB0+AB1+AB2+ \ldots +ABn)<ABmax \quad \text{Formula (1)}$$

$$E=\alpha*(AB0+AB1+AB2+ \ldots +ABn)/ABmax \quad \text{Formula (2)}$$

The allowable delay times with the other transmission planned data are denoted by T1, T2, . . . , and Tn respectively, and a current time is denoted by t. In this case, the transmission priority degree Q is calculated as described below. In addition, each of T1, T2, . . . , Tn and t represents a time in unit of "minute". However, without being limited to this, each of T1, T2, . . . , Tn and t may represent a time in unit of "second".

$$Q=\beta(1/(T1-t)+1/(T2-t)+ \ldots +1/(Tn-t)) \quad \text{Formula (3)}$$

However, when "Ti=t", the transmission priority degree Q of the transmission planned data is set as "Q=β*Q0". The transmission planned data which becomes "Ti=t" is the transmission planned data is the transmission planned data which is written a current time is written in the allowable delay information, and is set the processing priority degree to a predetermined value (Q0).

In addition, α and β represent weighting fixed numbers. When the weighting fixed number α is set so as to be larger than the weighting fixed number β, the aggregation efficiency E influences the selection of transmission planned data in data aggregation compared with the transmission priority degree Q. On the other hand, when the weighting fixed number β is set so as to be larger than the weighting fixed number α, the transmission priority degree Q influences the selection of transmission planned data in data aggregation compared with the aggregation efficiency E.

Moreover, the data aggregation unit 205 calculates the aggregation appropriateness degree A for each of the combination patterns of the transmission planned data.

$$A=E+Q \quad \text{Formula (4)}$$

In step A-41, the data aggregation unit 205 aggregates the transmission planned data of the combination patter which takes a maximum value of the calculated aggregation appropriateness degree A, and generates a sendable aggregated data.

When there is not any other transmission planned data which satisfies Formula (1) for a certain transmission planned data which is designated the designated allowable delay information as a current time, the data aggregation unit 205 makes the certain transmission planned data the aggregated data.

In step A-41, as described above, the data aggregation unit 205 calculates the regarding the aggregation efficiency E, the transmission priority degree Q and the aggregation appropriateness degree A with all combination patterns of the aggregated data including the transmission planned data selected in step A-31 and other transmission planned data. Subsequently, the data aggregation unit 205 returns to step A-31, and the repeatedly performs the process in step A-41 to the same group until there becomes no transmission planned data which is designated the allowable delay information as a current time in the group selected in step A-21. Moreover, when determining that there becomes no transmission planned data to be processed in step A-41 among transmission planned data in same group, the data aggregation unit 205 returns to step A-21, and repeats the same processes of step A-21 in which a new group is selected and subsequent steps.

When the transmission planned data is aggregated by the aggregation method A, for example, in the example described with reference to FIGS. 3 and 4, the following aggregation effect (that is, a data reduction ratio R) can be expected. That is, as compared with a case where data (1) and data (3) shown in FIG. 3 are separately transmitted to the second communication terminal 102 without being aggregated, in a case where the aggregated data shown in FIG. 4 is transmitted, the data reduction ratio R to be calculates by using Formula (5) is expected.

$$R=(HS+AHS+ABS1+ABS3)/((HS+AHS+ABS1)+(HS+AHS+ABS3))<1 \quad \text{Formula (5)}$$

In this estimation, it is assumed that, when the aggregated data is formed into a packet in step S604 shown in FIG. 6, the packet is an IP/UDP packet. Further, the total size of a header of a physical layer (L1), a header of a data link layer (L2) and a header of a network layer (L3) in OSP (Open Systems Interconnection) reference model is HS bytes. The size of an application header is AHS byte. The size of the application body of data (1) is ABS1 bytes. The size of the application body of data (3) is ABS3 bytes. According to Formula (5), it can be understood that, as compared with a case where data (1) and data (3) are separately transmitted, in a case where aggregating and transmitting data (1) and data (3), a data size of (HS+AHS) is reduced. This reduction effect becomes higher as a total number of aggregated transmission planned data increases.

Next, the aggregation method B will be described. In the aggregation method B, step B-1 described below is further added to step A-3 of the aggregation method A.

Step B-1: The data aggregation unit 205 generates an aggregated data from transmission planned data in which the allowable delay time is different from a current time (the transmission planned data is corresponds to the other transmission planned data in step A-3). The data aggregation unit 205 calculates the aggregation efficiency E, the transmission priority degree Q and the aggregation appropriateness degree A of all combination patterns of transmission planned data. Methods for calculating individual values are similar to those using Formula (1), (2), (3) and (4). However, each of values of the weighting fixed numbers α and β in Formulas (2) and (3) may be set to different values.

In the case where a value of the aggregation appropriateness degree A which is calculated here exceeds a predetermined value for a certain combination pattern, the data aggregation unit 205 generates an aggregated data from this combination pattern. As soon as a combination pattern in which a value exceeds a predetermined value is found, the data aggregation unit 205 may generate the aggregated data with the transmission planned data of the combination pattern. After extracting ail combination patterns whose values exceed a predetermined value, the data aggregation units 205 may generate the aggregated data in series from the transmission planned data of a combination pattern whose value of the aggregation appropriateness degree A is the highest. The data aggregation unit 205 repeats this operation until there becomes no combination pattern exceeding the predetermined value.

Next, the aggregation method C will be described. In the aggregation method C, the data aggregation unit 205 calculates the value of the aggregation efficiency E, the value of the transmission priority degree Q and the value of the aggregation appropriateness degree A are calculated of the each transmission planned data for all combination patters without distinction between the transmission planned data which is designated the allowable delay information as a current time and other transmission planned data. Since subsequent procedures are similar to those of the aggregation method B, description thereof is omitted here.

The predetermined value of the aggregation appropriateness degree A may be a value derived from, for example, "$A=\beta Q0$". In this case, it is possible to transmit the transmission planned data which is designated the allowable delay information as a current time without omission. This is because a value of the aggregation appropriateness degree A of the aggregated data including the transmission planned data which is designated the allowable delay information as a current time becomes a value derived from "$A=\beta Q0$" according to Formula (3), and thus, a value of the transmission priority degree Q of the aggregated data is invariably calculated as a value larger than $\beta Q0$.

Figure 8:
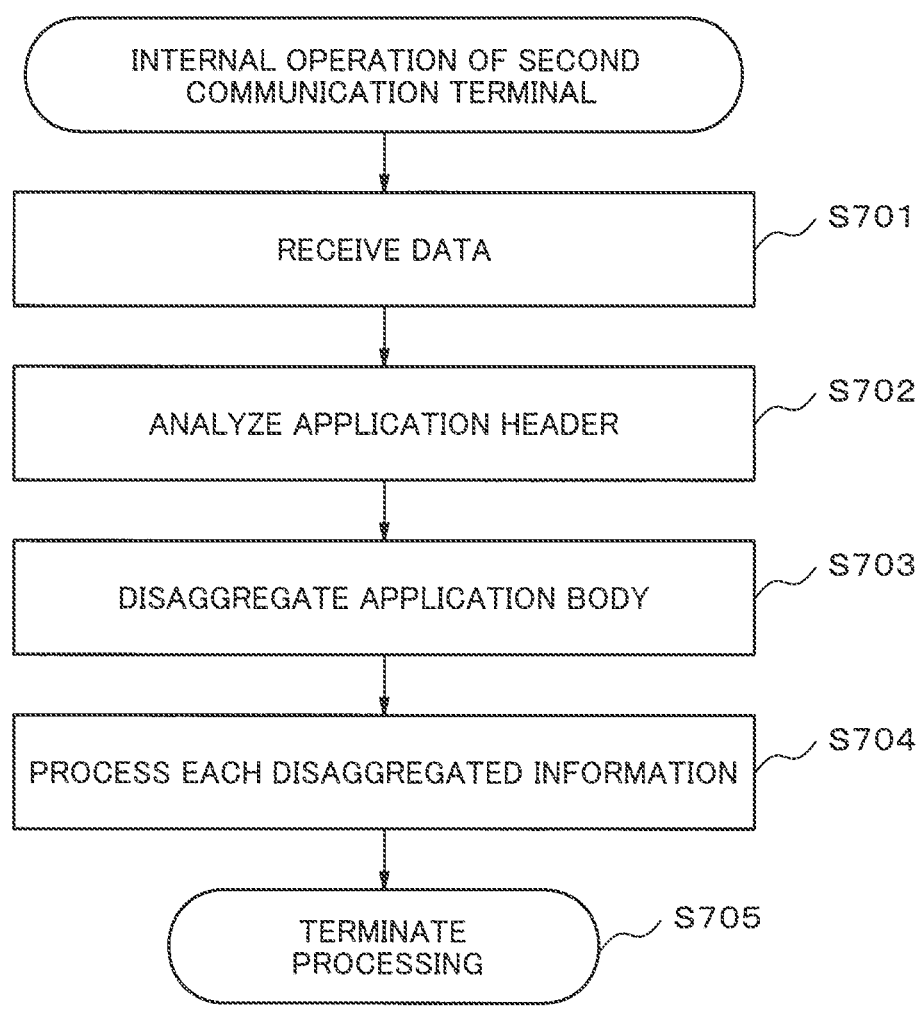

Next, the internal operation of the second communication terminal 102 is shown in FIG. 8. First, in the second communication terminal 102, the data reception unit 501 receives data from outside (in this case, from the first communication terminal 101). The second communication terminal 102 extracts the application data by removing a header for communication from the received data (Step S701). Next, the data analysis unit 502 analyzes the application header of the application data (Step S702).

Next, the data analysis unit 502 disaggregates the application body into processable units (a method for this disaggregation will be described below) (step S703). Next, the data processing unit. 505x of the data processing unit group 505 processes the units of information disaggregated in step S703 in accordance with the result of the analysis in step S702 (step S704). Next, the second communication terminal 102 terminates this processing (step S705).

A specific example for step S703 will be described. It is assumed a case where the data sizes of the processable units are written in a predetermined number of bytes in front of the application body. In this case, the second communication terminal 102 extracts data from the front of the application body in the just data sizes written in the above-described predetermined number of bytes. The data extracted here becomes a processable unit of data. The second communication terminal 102 repeats this process until there becomes no application body.

In such a way as described above, according to the first exemplary embodiment, it becomes possible to efficiently utilize a band of a communication medium from the first the communication terminal 101 to the second communication terminal 102. This is because it is possible to aggregate the transmission planned data from the first communication terminal 101 to the second communication terminal 102.

In the first exemplary embodiment, the individual components may perform operations described below Hereinbefore, it is described a case where each of the generation unit 201x constituting the data generation unit group 201 transfers its own identifier, but the first exemplary embodiment is not limited to this. The transmission timing management unit 202 may acquire an identifier of a data generation source.

Each of the data generation unit 201x constituting the data generation unit group 201 may the transfer allowable delay information instead of its own identifier to the transmission timing management unit 202.

Each of the data generation unit 201x constituting the data generation unit group 201 may generate a plurality of kinds of transmission planned data and may transmit each data at individual timing.

When notifying transmission timing to the data aggregation unit 205, the transmission timing management unit 202 may notify the identifier of data updated or the identifier of data to be determined transmission timing on the basis of the allowable delay information. In this time, the data aggregation unit 205 may estimate the generation of an aggregated data on the basis of data which is made such a notification.

The data generation unit group 201 may exist on a communication terminal different from the first communication terminal 101.

The transmission timing management unit 202 may acquire the allowable delay information on the basis of information included in the transmission planned data received from the data generation unit 201x when acquiring the allowable delay information of the transmission planned data from the allowable delay information storage unit 203. In the case, the information included in the transmission planned data is the identifier of the destination terminal, the application header or the application body which is described above, or a part of the information. Here, a specific example of the part of the information include an IP address of the destination terminal, an ECHONET service class and an ECHONET property cord in ECHONET, and information indicating a request content of GET, POST and so on in HTTP.

The allowable delay information storage unit 203 may store the transmission priority degree Q as the allowable delay information. In this case. Formula (2) is changed into Formula (2a) shown below. That is, when it is assumed that transmission priority degrees of other transmission planned data are denoted by Q1, Q2, and Qn, the transmission priority degree Q of the aggregated data is calculated as follows.

$$Q = \beta(Q1 + Q2 \ldots + Qn) \quad \text{Formula (2a)}$$

An application body constituting the application data generated by the data generation unit 101 may include a plurality of application bodies. In this case, the data size of each of the application bodies is necessary to be written in a predetermined number of bytes from the front of the each of the plurality of application bodies.

The processing method stored in the application body processing method storage unit 504 may be a method of disaggregating the application body in unit of each predetermined size. In this case, when generating the transmission planned data, the data generation unit 201x needs to generate data in which data sizes of the application bodies are identical.

The processing method stored in the application body processing method storage unit 504 may be a method for disaggregating the application body in accordance with a disaggregation method of the application body written at a predetermined position of the application body. In this case, after integrating the application bodies, the data aggregation unit 205 of the first communication terminal 101 needs to append data which includes the disaggregation method to the front portion. A specific example of this disaggregation method includes a method in which a list of data sizes of the transmission planned data targeted for aggregation is written. The data analysis unit 502 of the second communication terminal 102 disaggregates the application bodies in the aggregated data in accordance with the data sizes which are written in this disaggregation method.

Next, a second exemplary embodiment of the present invention will be described with reference to FIGS. 9 to 11B. As compared with the aforementioned first exemplary embodiment, the second exemplary embodiment is different therefrom in the respect that a transmission planned data storage unit stores therein the transmission planned data by using data structure for a waiting line (i.e., queueing). Hereinafter, differences between configuration and operation of the second exemplary embodiment and those having been described in the first exemplary embodiment will be described.

Figure 9:
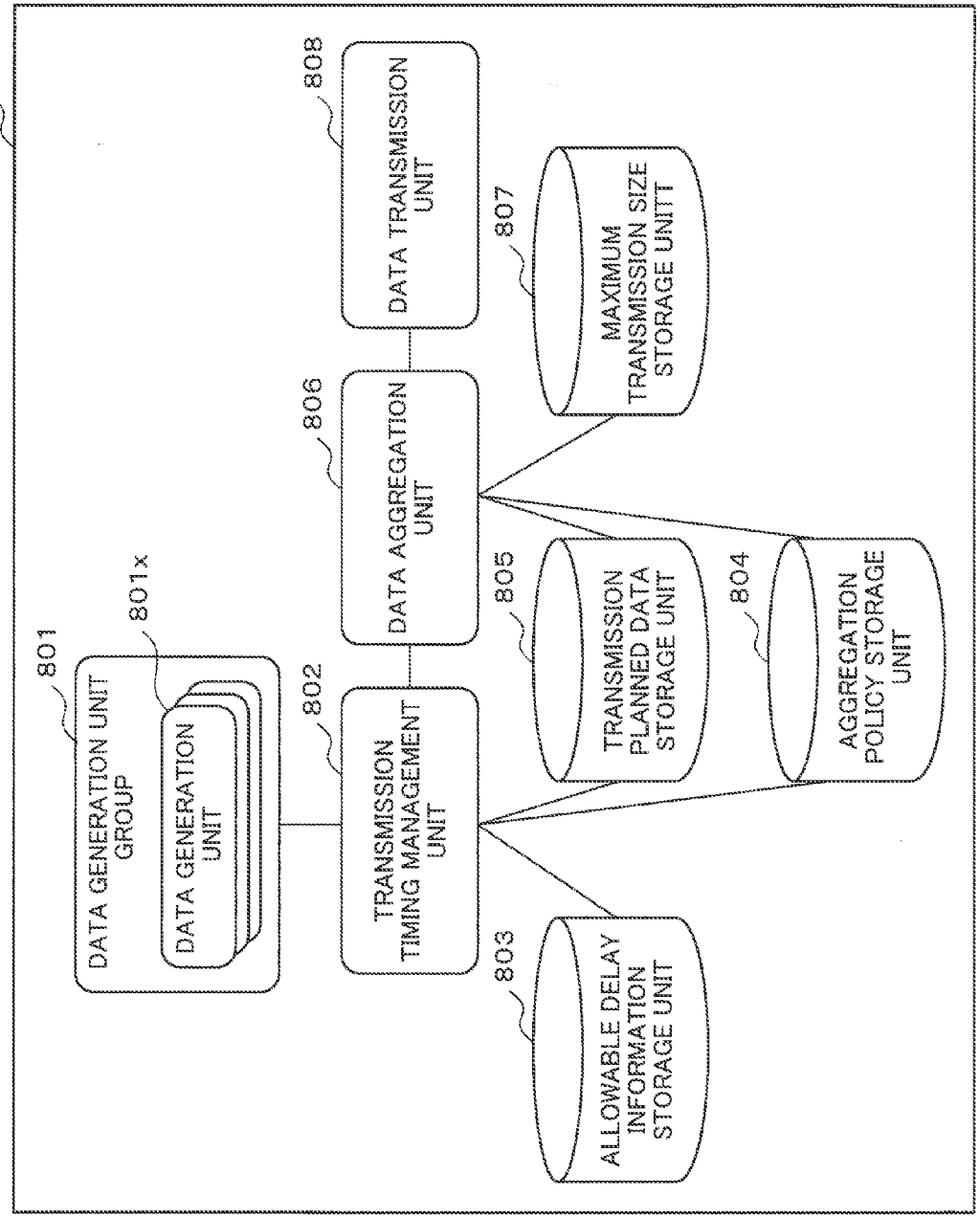

An example of a configuration of a first communication terminal 101a of the second exemplary embodiment is shown in FIG. 9. The first communication terminal 101a has a configuration corresponding to that of the first communication terminal 101 shown in FIGS. 1 and 2. A data generation unit group 801 shown in FIG. 9 has a configuration corresponding to that of the data generation unit group 201 shown in FIG. 2. Similarly, a data generation unit 801.x has a configuration corresponding to that of the data generation unit 201x. A transmission timing management unit 802 has a configuration corresponding to that of the transmission timing management unit 202. An allowable delay information storage unit 803 has a configuration corresponding to that of the allowable delay information storage unit 203. A transmission planned data storage unit 805 has a configuration corresponding to that of the transmission planned data storage unit 204. A data aggregation unit 806 has a configuration corresponding to that of the data aggregation unit 205. A maximum transmission size storage unit 807 has a configuration corresponding to that of the maximum transmission size storage unit 206. An aggregation policy storage unit 804 has a configuration corresponding to that of the aggregation policy storage unit 207. A data transmission unit 808 has a configuration corresponding to that of the data transmission unit 208.

The transmission timing management unit 802 receives the transmission planned data and the identifier of the data generation unit 801x from the data generation unit group 801. The transmission timing management unit 802 receives the transmission priority degree from the allowable delay information storage unit 803 as the allowable delay information related to the data generation unit 801x. The transmission timing management unit 802 receives information related to the aggregation method from the aggregation policy storage unit 804. The transmission timing management unit 802 inputs the transmission planned data into a transmission queue sq included in the transmission planned data storage unit 805 in view of an aggregation policy and a transmission priority degree (a method for inputting the transmission planned data into the transmission queue sq being described below).

Figure 10:
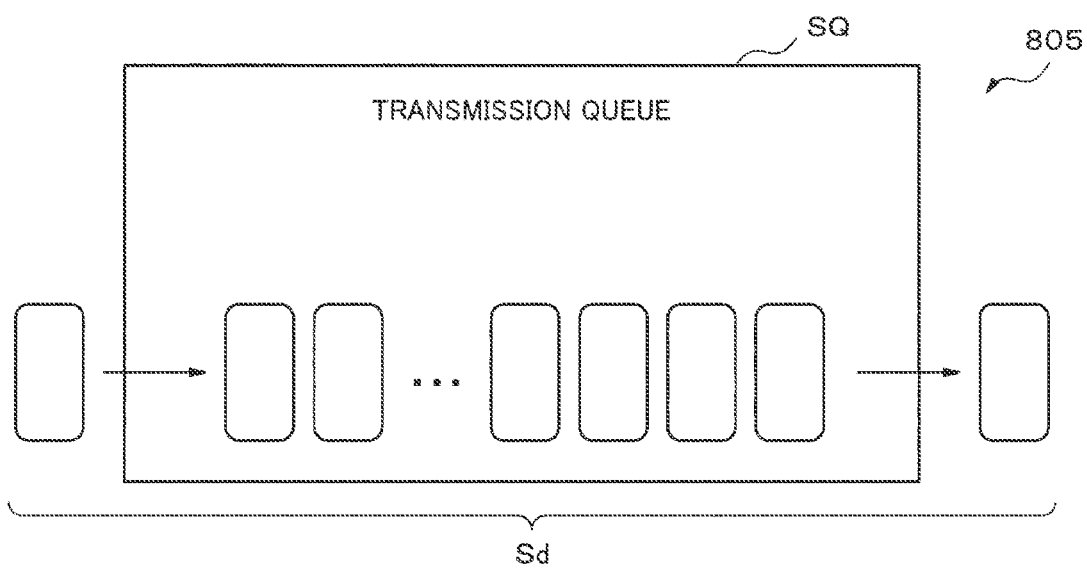

An example of a configuration employing the transmission queue sq is shown in FIG. 10 when making the allowable delay information a transmission priority degree in accordance with the aforementioned [Procedure 1A] and [Procedure 1B] as the aggregation policy. This transmission queue SQ is for the transmission planned data. The identifier of the terminal is "terminal A", the application header is "AH1" and the transmission priority degree is "immediate".

The transmission queue SQ is provided for each of transmission priority degrees for sets of the identifier of the destination terminal and the application header. A plurality of the transmission queues SQ are provided with a corresponding of combinations of the transmission priority degrees and the sets of the identifier of the destination terminal and the application header. In this time, when there is not any transmission queue SQ, a transmission queue SQ is newly generated in the transmission planned data storage unit 805, and the transmission planned data (which is denoted by a reference sign Sd in FIG. 10) is inputted to the transmission queue SQ. The transmission timing management unit 802 instructs the data aggregation unit to begin aggregation of data when the transmission planned data is updated, when the "immediate" or "high priority" transmission planned data is updated, or at predetermined intervals.

The allowable delay information storage unit 803 stores the identifier of the data generation unit 801x and the transmission priority degree such that they are associated with each other. In response to a request from the transmission timing management unit 802, the allowable delay information storage unit 803 transfers the relevant transmission priority degree to the transmission timing management unit 802. A specific example of the transmission priority degree include information indicating that the data should be immediately transmitted, information indicating that the data should be transmitted with a relatively high priority degree, and information indicating that the data should be transmitted with a relatively low priority degree.

As shown in FIG. 10, the transmission planned data storage unit 805 stores the transmission planned data by using the transmission queue SQ provided for each of the transmission priority degrees, the identifier of the destination terminal, and the application header. In that time, in response to a request from the transmission timing management unit 802, the transmission planned data storage unit 805 stores the transmission planned data by using a relevant of the transmission queues SQ. The transmission queue SQ may be, for example, a queue of a FIFO (First In First Out) or the like. In this case, the transmission queue SQ operates such that the data is read out in order to storing in the queue. That is, the transmission planned data storage unit 805 stores, as the transmission planned data, the application data which is included in the transmission planned data received from the transmission timing management unit 802 into any one of the transmission queues SQ which is provided so as to be associated with information indicating the earlier or later of transmission order of the application data relative to that of any other transmission planned data (that is, the priority degree) and information indicating the destination terminal of the application data (that is, the identifier of the destination terminal).

The data aggregation unit 806 receives an instruction for aggregation of the transmission planned data from the transmission timing management unit 802. The data aggregation unit 806 acquires the maximum transmission size of the application body to the destination from the maximum transmission size storage unit 807. The data aggregation unit 806 acquires information related to an aggregation method from the aggregation policy storage unit 804. The data aggregation unit 806 sequentially extracts the transmission planned data from data accumulated in the transmission queue SQ with a high transmission priority degree in the transmission planned data storage unit by considering the aggregation method and the maximum transmission size, and generates the aggregated data. As the generation method for the aggregated data, the data aggregation unit 806 performs aggregation of data for each transmission queue SQ to which the identifier of the destination terminal and the application header are common (the generation method for the aggregated data being described below).

The internal operation of the first communication terminal 101a will be described with reference to FIG. 6 by indicating differences with the above first exemplary embodiment. In step S603 shown in FIG. 6, the first communication terminal 101a extracts the transmission planned data from the each transmission queue SQ in the planned data storage unit 805 as needed by considering the aggregation policy and the maximum transmission size, and generates the aggregated data. An aggregation method for the aggregation data in step S603 shown in FIG. 6 will be described as an aggregation method D.

Figures 11A, 11B:
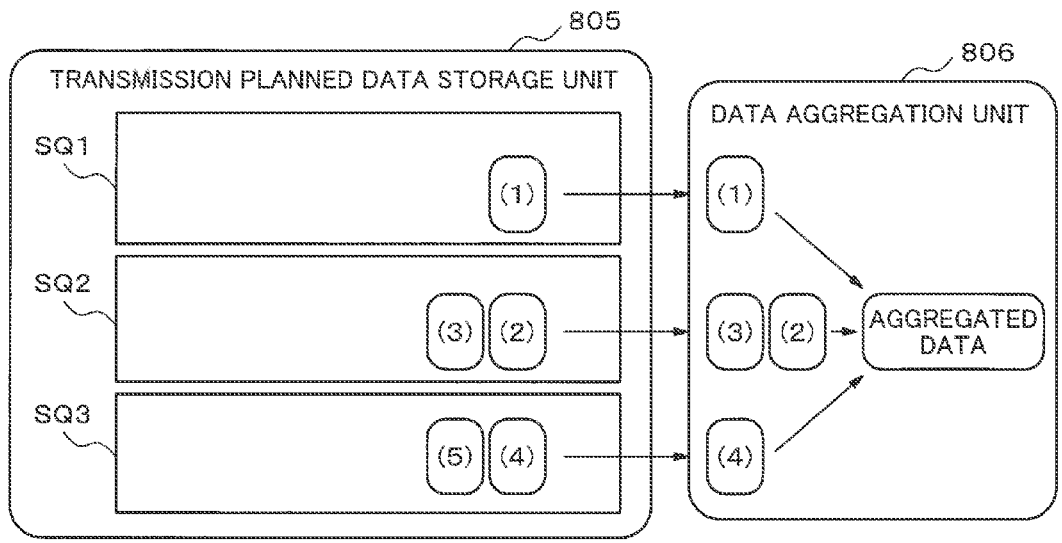
Figure 12:
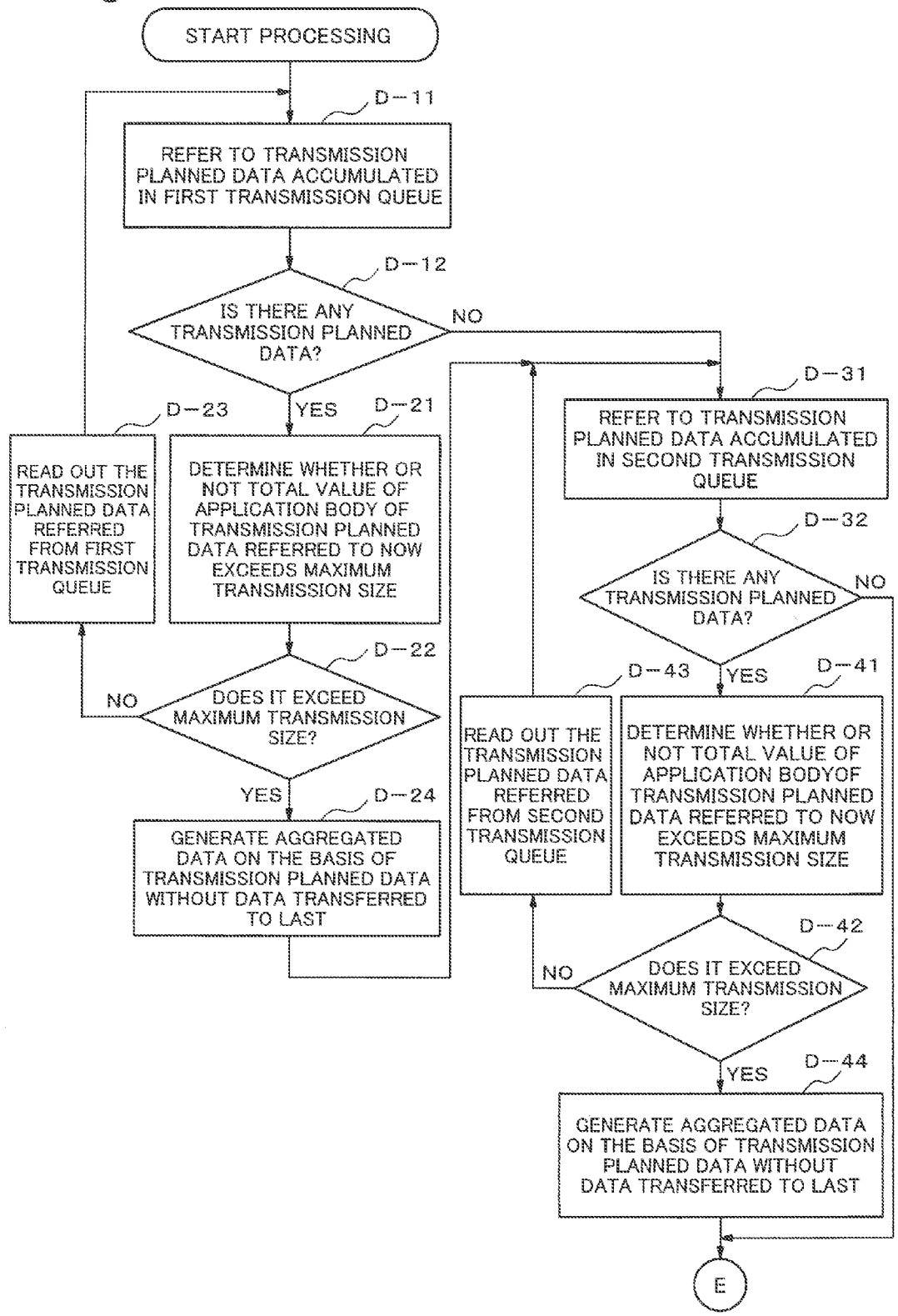
Figure 13:
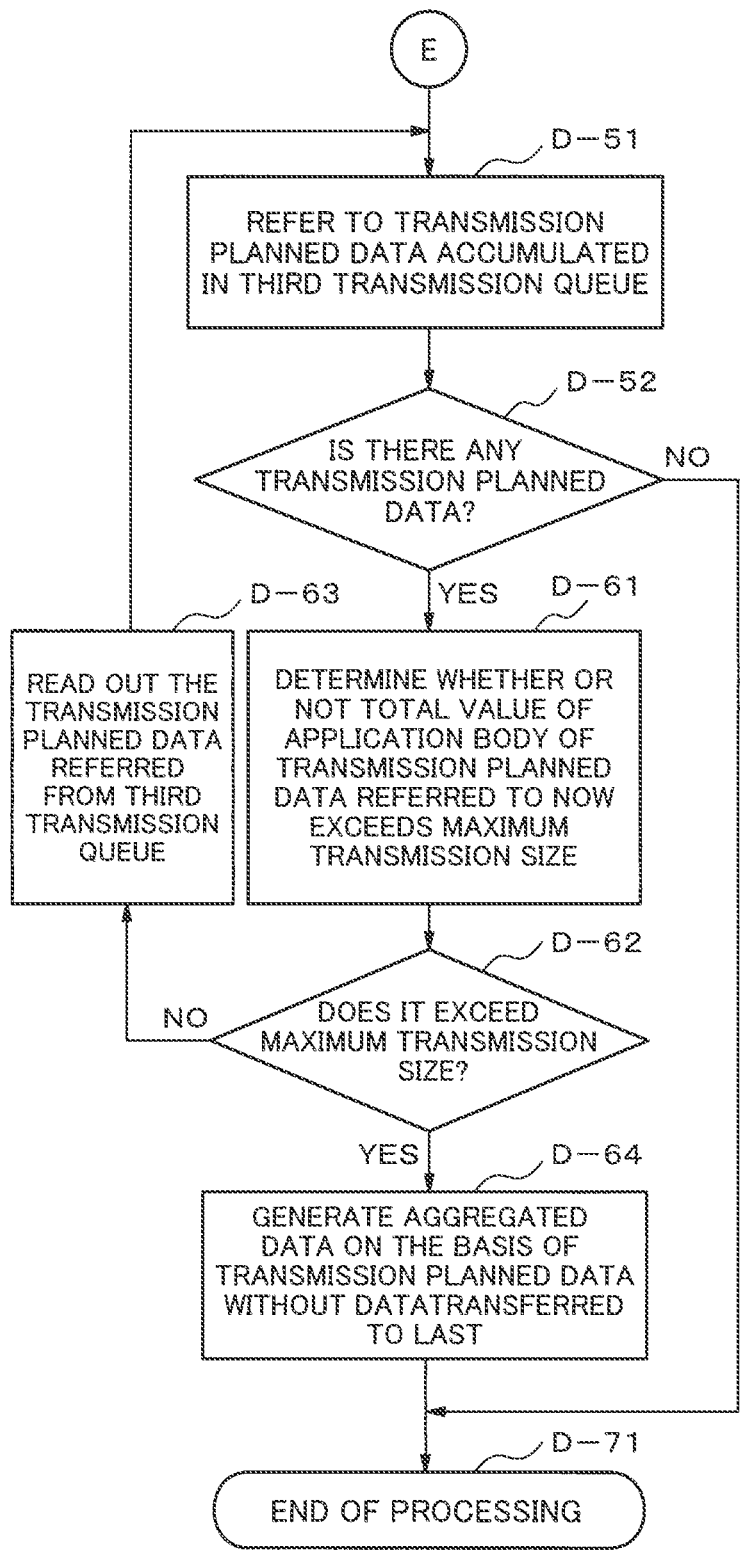

Aggregation Method D:

The aggregation method D will be described with reference to FIG. 11A, FIG. 11B, FIG. 12 and FIG. 13. FIG. 11A is a diagram illustrating an example of a configuration of the transmission queues SQ which are provided in the transmission planned data storage unit 805. FIG. 11A is a diagram illustrating an example of transmission planned data stored in the individual transmission queue SQ. FIG. 12 and FIG. 13 are flowcharts illustrating flows of aggregation processing performed in the aggregation method D. A flow shown in FIG. 12 and a flow shown in FIG. 13 are connected with a connector E.

As shown in FIG. 11A, in the aggregation method D, as the transmission queues SQ, a first transmission queue SQ 1, a second transmission queue SQ 2 and a third transmission queue SQ 3 are provided in the transmission planned data storage unit 805. The first transmission queue SQ1 is used for the transmission planned data which has the highest priority degree "immediate". The second transmission queue SQ2 is used for the transmission planned data which has the second highest priority degree "high priority". The third transmission queue SQ3 is used for the transmission planned data which has the lowest priority degree "low priority". In the transmission planned data (which are denoted by "(1)" to "(5)") in the transmission queues SQ 1 to 3, the identifiers of the destination terminal (terminal A) are identical and the application headers (AH1) are identical mutually. As shown in FIG. 11B, the application bodies of data (1) to (5) are respectively AB1, AB2, AB3, AB4, and AB5. The data aggregation unit 806 generates the aggregated data on the basis of the plurality of transmission queues SQ1 to 3 used for the transmission planned data whose identifier of the destination terminal and the application head are identical.

A maximum transmission size of the application bodes is denoted by ABmax.

Step D-11 (refer to FIG. 12): The data aggregation unit 806 refers the transmission planned data accumulated into the first transmission queue SQ1 in the transmission planned data storage unit 805.

Step D-12: The data aggregation unit 806 determines whether or not there is the transmission planned data accumulated in the first transmission queue SQ1 When determining that there is the transmission planned data in the first transmission queue SQL the data aggregation unit 806 proceeds to step D-21. When determining that there is no transmission planned data in the first transmission queue SQL the data aggregation unit 806 proceeds to step D-31. In the example shown in FIG. 11A, data (1) corresponds to the transmission planned data accumulated in the first transmission queue SQL Step D-21: The data aggregation unit 806 determines whether or not a total value of the sizes of application bodies in the transmission planned data referred to now exceeds the maximum transmission size.

When determining that the total value does not exceed the maximum transmission size (step D-22: No), the data aggregation unit 806 extracts the transmission planned data (step D-23), and proceeds to step D-11.

When determining that the total value exceeds the maximum transmission size (step D-22: Yes), the data aggregation unit 806 generates the aggregated data on the basis of the transmission planned data except the transmission planned data referred to last (step D-24).

In the example shown in FIG. 11 A, the data aggregation unit 806 determines that the size of data (1) does not exceed the maximum transmission size, and extracts data (1). When the data aggregation unit 806 performs processing of step D-12 once again, the data aggregation unit 806 proceeds to step D-31 because the first transmission queue SQ1 is empty.

Step D-31: The data aggregation unit 806 refers the transmission planned data accumulated in the second transmission queue SQ2.

Step D-32: The data aggregation unit 806 determines whether or not there is the transmission planned data accumulated in the second transmission queue SQ2. When determining that there is the transmission planned data in the second transmission queue SQ2 (step D-32: Yes), the data aggregation unit 806 proceeds to step D-41. When determining that there is no transmission planned data in the second transmission queue SQ2 (step D-32: No), the data aggregation unit 806 proceeds to step D-51 (refer to FIG. 13).

Steps D-41 to D-44: Processes similar to those of steps D-21 to D-24 are performed.

In the example shown in FIG. 11 A, data (2) and data (3) are extracted by performing the processes of step D-31 and D-41 twice. In this case, the total value of the sizes of application bodies included in transmission planned data extracted to now is assumed not to reach the maximum transmission size (AB1+AB2+AB3≤ABmax). Thus, the processing of step D-31 is performed once again. In this case, because the second transmission queue SQ2 is empty, the processing proceeds to step D-51.

Step D-51: The data aggregation unit 806 refers the third transmission queue SQ.

Step D-52: The data aggregation unit 806 determines whether or not there is the transmission planned data accumulated in the third transmission queue SQ. When determining that that there is the transmission planned data (step D-52: Yes), the data aggregation unit 806 proceeds to step D-61. When determining that that there is no transmission planned data (step D-52: No), the data aggregation unit 806 proceeds to step D-71.

Steps D-61 to D-64: The data aggregation unit 806 performs processes similar to those of steps D-21 to D-24 or those of steps D-41 to D-44.

Step D-71: The data aggregation unit 806 terminates this processing.

In the example shown in FIG. 11 A, by performing the process of step D-51 and the process of D-61 twice, the data aggregation unit 806 refers to and extracts data (4), and refers to data (5). In this case, it is assumed that a total value of the sizes of application bodies included in transmission planned data up to now exceeds the maximum transmission size at the time when data (5) is referred to (AB1+AB2+AB3+AB4+AB5>ABmax). The data aggregation unit 806 generates the aggregated data on the basis of transmission planned data (data (1), (2), (3) and (4)) except the transmission planned data referred to last.

In this aggregation method D, when one transmission planned data exceeds the maximum transmission size, the data aggregation unit 806 transfers the data without aggregating the data Hereinafter, in a plurality of transmission queues SQ identified by "a different identifier of the destination terminal and a different application header", the data aggregation unit 806 also performs processes similar to those of steps D-11 to D-64.

The data aggregation unit 806 terminates the processing at the time when having performed processes regarding all transmission queues SQ.

According to the first communication terminal 101a according to the second exemplary embodiment, it is possible to aggregate the transmission planned data without considering the allowable delay time of each of the transmission planned data. This is because of using the transmission queues SQ which are provided on the basis of the aggregation policy and the transmission priority degrees. This is also because the transmission queues SQ operates such that the transmission planned data accumulated therein is extracted in series in accordance with order in which the transmission planned data is accumulated therein.

Next, in the aforementioned communication system of the first exemplary embodiment, a specific example of processing in which messages conforming to an ECHONET standard are dealt with between the communication terminals 101 and 102 will be described.

An example of the transmission planned data used in this example of processing is shown in FIG. 14. The transmission planned data includes, roughly separately, the identifier of the destination terminal, the application header, and the application body. In this example, an IP address corresponds to the identifier of the destination terminal. SEOJ, DEOJ and ESV correspond to the application header. SEOJ is a destination ECHONET object. DEOJ is a transmission source ECHONET object. ESV is an ECHONET service. EPC, PDC and EDT correspond to the application body. EPC is an ECHONET property code. PDC is a property data counter. EDT is an ECHONET data.

According to the ECHONET standard, data sizes are as follows. The data size of SEOJ is three bytes. The data size of DEOJ is three bytes. The data size of ESV is one byte. The data size of EPC is one byte. The data size of PDC is one byte. The data size of EDT is an optional size designated by a value of PDC.

In data (1), as the identifier of the destination terminal, "IP address=10.10.10.10" is designated. As the application header, "SEOJ=0x05FF01", "DEOJ=0x027D01" and "ESV=0x60" are designated (here, "0x" is a prefix representing a hexadecimal number). As the application body, "EPC=0xE0", "PDC=0x04", and "EDT=0x10000000 (the size is four bytes)" are allocated.

In data (2), as the identifier of the destination terminal, "IP address=20.20.20.20" is designated. As the application header, "SEOJ=0x05FE01", "DEOJ=0x027901" and "ESV=0x61" are designated. As the application body, "EPC=0xE5", "PDC=0x01" and "EDT=0x33 (the size is one byte)" are allocated.

In data (3), as the identifier of the destination terminal. "IP address=10.10.10.10" is designated. As the application header, "SEOJ=0x0SFF01", "DaEOJ=0x027D01" and "ESV=0x60" are designated. As the application body, "EPC=0xD7", "PDC=0x01" and "EDT=0x00 (the size is one byte)" are allocated.

In the example shown in FIG. 14, in data (1) and data (3) are data, the identifiers of the destination terminal and the application headers are same data.

In FIG. 15, the transmission planned data stored in the transmission planned data storage unit 204 are shown. Data (d1) is data in which Data (1) shown in FIG. 14 is associated with the allowable delay time "12:00" (=12 hours 00 minutes) and is stored. Data (d2) is data in which Data (2) shown in FIG. 14 is associated with the allowable delay time "13:00" and is stored. Data (d3) is data in which Data (3) shown in FIG. 14 is associated with the allowable delay time "12:30" and is stored. Data (d4) is data in which a new data not shown in FIG. 14 is associated with the allowable delay time "13:00" and is stored. Data (d4) includes the identifier of the destination terminal and the application header which are identical to those of data (1) and (3) shown in FIG. 14. In data (d4), "EPC=0xD9", "PDC=0x01" and "EDT=0x00 (the size is one byte)" are allocated as the application body.

The aggregation policy is defined by [Procedure 1B] and [Procedure 2B] described below.

[Procedure 1B]: extracting the transmission planned data which has common values of the IP address of the destination terminal, SEOJ, DEOJ and ESV.

[Procedure 2B]: communalizing the IP address of the destination terminal, SEOJ, DEOJ and ESV, and making data jointed EPC, PDC and EDT a new aggregated data.

When the data transmission unit 208 transmits the aggregated data, a destination source IP address and a UDP header are appended to the aggregated data as the identifier of the terminal. As the application header for ECHONET, EHD1, EHD2, TID and OPC are further added to the aggregated data. EHD1 and EHD2 are an ECHONET telegram header 1 and an ECHONET telegram header 2. TID is a transaction ID. OPC is a number of sets of EPC, PDC and EDT included in the transmitted data.

It is assumed that the information related to a communication band, that is, the maximum transmission size is a maximum size of EPC, PDC and EDT=100 bytes.

A case where the data aggregation unit 205 performs aggregation processing by using the aggregation method A described with reference to FIG. 7 will be described. It is assumed a state in which a current time t is 12:00 (=12 hours 00 minutes).

Figure 7:
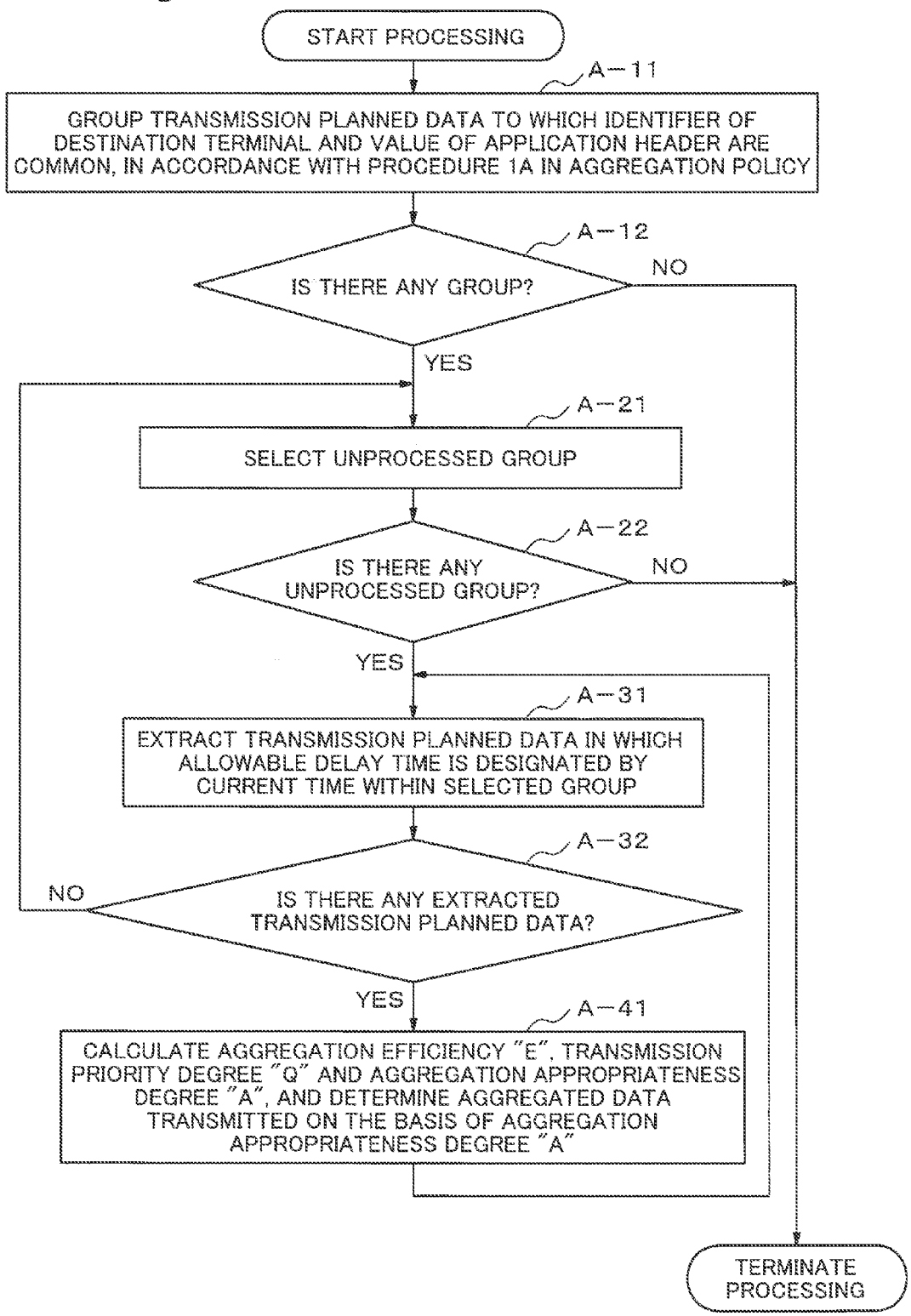

In step A-11 shown in FIG. 7, the data aggregation unit 205 groups the each transmission planned data which communalizes an IP address of the destination terminal, SEOJ, EDOJ and ESV in accordance with [Procedure 1B] of the aggregation policy. In the example shown in FIG. 15, data (d1), (d3) and (d4) communalize IP addresses of the destination terminals SEOJs. EDOJs and ESVs. Thus, the data aggregation unit 205 groups from data d1 to d4 into two groups. A first group includes data (d1), (d3) and (d4). A second group includes data (d2).

Next, in step A-21 shown in FIG. 7, the data aggregation unit 205 selects the first group.

Next, in step A-31 shown in FIG. 7, the data aggregation unit 205 extracts, in the first group, the transmission planned data of which the allowable delay time is designated by a current time. In this example, because the allowable delay time of data (d1) is "12:00", the data aggregation unit 205 extracts data (d1).

Next, in step A-41 shown in FIG. 7, the data aggregation unit 205 calculates the aggregation efficiency E, the transmission priority degree Q and the aggregation appropriateness degree A with respect to all combination patterns of the aggregated data which includes the data extracted in step A-31 and one or more of the other transmission planned data. The aggregation efficiency E is calculated by using Formula (1) and Formula (2) in the first exemplary embodiment.

Combination pattern which are considered here are as follows.

Combination pattern (1): data (d1) and data (d3)
Combination pattern (2): data (d1) and data (d4)
Combination pattern (3): data (d1), data (d3) and data (d4)

The aggregation unit 205 calculates the aggregation efficiency E of each of the combination patters (1) to (3).

The size of the application body of data (d1) is six bytes (1+1+4). According to similar calculation, the size of the application body of data (d3) and data (d4) are three bytes. Thus, each of the combination patterns (1) to (3) satisfies the condition of Formula (1).

Next, the data aggregation unit 205 calculates the aggregation efficiency E of each of the combination patterns which satisfy the condition of Formula (1) by using Formula (2). Here, the calculation is performed on an assumption as $\alpha=100$.

$$E \text{ the combination pattern } (1) = 100*(3)/100 = 3$$

According to similar calculation, the aggregation efficiency E of each of the combination patterns (2) and (3) is calculated as follows.

$$E \text{ of the combination pattern } (2) = 3$$

$$E \text{ of the combination pattern } (3) = 6$$

Next, the data aggregation unit 205 calculates the transmission priority degree Q of each of the combination patterns which satisfy the condition of Formula (1) by using Formula (3) shown in the first exemplary embodiment. Here, the calculation is performed on an assumption as $\beta=120$.

$$Q \text{ of the combination pattern } (1) = 120*(1/30) = 4$$

$$Q \text{ of the combination pattern } (2) = 120*(1/60) = 2$$

$$Q \text{ of the combination pattern } (3) = 120*(1/30 + 1/56) = 6$$

Next, the data aggregation unit 205 calculates the aggregation appropriateness degree A of each of the combination patterns which satisfy the condition of Formula (1) by using Formula (4) shown in the first exemplary embodiment.

$$A \text{ of the combination pattern } (1) = 7$$

$$A \text{ of the combination pattern } (2) = 5$$

$$A \text{ of the combination pattern } (3) = 12$$

It is determined that a combination pattern for which the calculated aggregation appropriateness degree A takes a maximum value is the combination pattern (3). The data aggregation unit 205 selects the set of data of the combination pattern (3), that is, the data set including data (d1), data (d3) and data (d1) as pattern of constitution data of the aggregated data.

Next, the data aggregation unit 205 aggregates the transmission planned data included in the combination pattern (3) in accordance with [Procedure 2B] of the aggregation policy. The aggregated data generated as the result of the data aggregation processing performed by the data aggregation unit 205 is shown in FIG. 16. As shown in FIG. 16, the aggregated data which is generated includes "the IP address of the destination terminal=10.10.10.10", and "SEOJ=0x05FF01", "DEOJ=0x027001" and "ESV=0x60" as the application header. Further, the generated aggregated data which is generated includes "EPC=0xE0", "PDC=0x04" and "EDT=0x10000000" which are the application bodies of data (d1) as the application body. Moreover, the generated aggregated data which is generated, subsequently, includes "EPC=0xD7", "PDC=0x01" and "EDT=0x00" which are the application bodies of data (d3). Finally, the generated aggregated data which is generated, subsequently, includes "EPC=0xD9", "PDC=0x01" and "EDT=0x00" which are the application bodies of data (d4).

The communication system 100 according to the individual exemplary embodiments described above can be applied to a communication apparatus which transmits data having a size smaller than a maximum transmission size of a communication network to a different communication apparatus. Specifically, the communication system 100 can be applied to a communication server, a relay server and the like.

Each embodiment of the present invention is not limited to the aforementioned configurations and operations. For example, each embodiment can divide, disperse or integrate each of the blocks illustrated in the configuration examples shown in FIG. 2, FIG. 5 and FIG. 9. The configuration examples shown in FIG. 2, FIG. 5 and FIG. 9 can be realized by using a CPU (Central Processing Unit) and programs executed by the CPU. The programs in the case can be distributed into a computer-readable recording medium or via a communication line.

Figure 17:
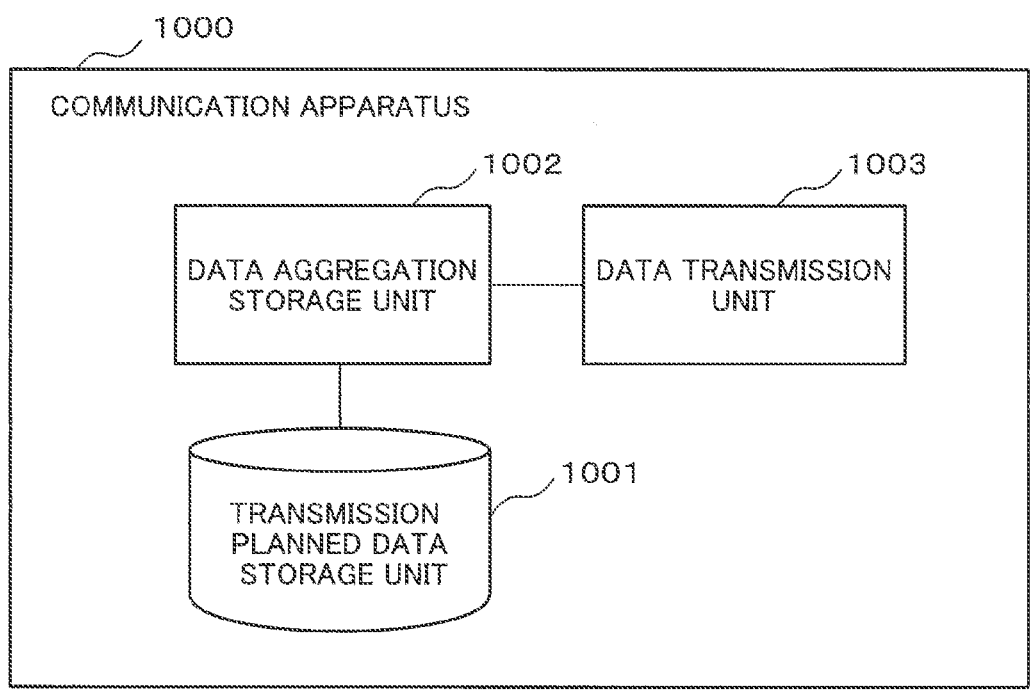

A fundamental exemplary embodiment of the present invention including the first exemplary embodiment and second exemplary embodiment is shown in FIG. 17. As shown in FIG. 17, a communication apparatus 1000 according to the fundamental exemplary embodiment of the present invention includes a transmission planned data storage unit 1001, a data aggregation unit 1002 and a data transmission unit 1003. The transmission planned data storage unit 1001 stores therein a plurality of the application data each associated with the transmission order information (information indicating the earlier of later of transmission order of the application data) indicating the transmission order and the destination information indicating the destination terminal which is a transmission destination. The transmission planned data storage unit 1001 extracts a plurality of the application data which are mutually associated with identical destination information from a plurality of the application data. The transmission planned data storage unit 1001 extracts a plurality of the application data targeted for aggregation from a plurality of the extracted application data on the basis of the maximum transmission size indicating an upper limit of a data size and the transmission order information. The transmission planned data storage unit 1001 generates the aggregated data which is allocated to the identical destination information on the basis of a plurality of the application data targeted for aggregation. The data transmission unit 1003 transmits the aggregated data to the destination terminal which is indicated by the allocated destination information.

The transmission planned data storage unit 1001 corresponds to the transmission planned data storage unit 204 shown in FIG. 2 and the transmission planned data storage unit 805 shown in FIG. 9. The data aggregation unit 1002 corresponds to the data aggregation unit 205 shown in FIG. 2 and the data aggregation unit 806 shown in FIG. 9. The data transmission unit 1003 corresponds to the data transmission unit 208 shown in FIG. 2 and the data transmission unit 808 shown in FIG. 9.

The whole or part of the exemplary embodiments disclosed above can be described as, but not limited to, the following supplementary notes.

(Supplementary Note 1)

A communication system includes an aggregation method storage unit, an aggregation data determination unit, a data aggregation unit and a communication unit.

The aggregation method storage unit stores a data aggregation method which is processable by a communication terminal at a data receiving side.

The aggregation data determination unit determines, as an aggregation target, a combination constituted with one application data or over among at least one application data on the basis of an identifier of destination terminal, the data aggregation method and a maximum transmission size.

The data aggregation unit generates a new application data by aggregating at least one application data which is determined as the aggregation target in accordance with the data aggregation method.

The communication unit transmits the aggregated data on the basis of the identifier of destination.

(Supplementary Note 2)

The aggregation data determination unit further determines, as the aggregation target, a combination of application data on the basis of information related to a transmission priority level of each application data.

(Supplementary Note 3)

The aggregation data determination unit determines, as the aggregation target, a combination of application data which has a large ratio of a size of an aggregated data generated on the basis of the aggregation method relative to the maximum transmission.

(Supplementary Note 4)

The aggregation data determination unit further determines a priority degree regarding a transmission priority level of each combination of the application data on the basis of information related to a transmission priority level of each application data, and determines, as the aggregation target, a combination which has a large value of the priority degree.

(Supplementary Note 5)

The aggregation data determination unit determines, as the aggregation target a combination having a large value of a weighted average of both the ratio of a size of an aggregated data, which is generated on the basis of the aggregation method, to the maximum transmission size, and the priority degree regarding transmission order of each application data.

(Supplementary Note 6)

The application data is accumulated into a different transmission queues associated with information each related to a transmission priority level. The aggregation data determination unit extracts the one application data which is accumulated in each of the transmission queues in order from a transmission queue of a higher transmission priority level to a transmission queue of a lower transmission priority level, and determines an aggregation target such that they fit into the maximum transmission size by.

(Supplementary Note 7)

The data aggregation method is a method for generating a new application data by communizing the identifier of the destination terminal and at least one information among application headers which construct the application data by using at least one application data which has the identifier of the destination terminal and at least one information among application headers which construct the application data as common value, and aggregating the application bodies which constructs application data.

(Supplementary Note 8)

The application header is information appended to a head of the application data, and is information corresponding to at least one of EHD, TID, DEOJ, SEOJ, ESV and OPC in ECHONET, and is a message header in HTTP.

The application body is information of data-body which is removed a header information from the application data, and is information corresponding to at least one of EPC, PDC and EDT in ECHONET, and corresponding to a message body in HTTP.

(Supplementary Note 9)

A communication system includes a communication apparatus at a transmitting side; a communication apparatus at a receiving side; and a network connecting which connects them.

The communication apparatus at a transmitting side includes an aggregation method storage unit, an aggregation data determination unit and a communication unit.

The aggregation method storage unit stores a data aggregation method which is processable by a data second communication terminal. The aggregation data determination unit determines, as an aggregation target, a combination which is constituted with at least one application data among at least one application data on the basis of identifiers of destination terminal, the data aggregation method and a maximum transmission size.

The communication unit transmits a data aggregation means which generates a new application data by aggregating the at least one application data determined as the aggregation target in accordance with the data aggregation method and the new application data item generated through the aggregation on the basis of the identifier of the terminal.

The network transmits the application data transmitted from the communication apparatus at a transmitting side to the communication apparatus at a receiving side.

The communication apparatus at a receiving side includes a reception unit and an aggregated data processing unit.

The reception unit receives the new application data generated through the aggregation from the communication apparatus at a transmitting side.

The aggregated data processing unit processes the new application data generated through the aggregation by using a data analysis method corresponding to the processable data aggregation method which is stored in the communication apparatus at a transmitting side.

(Supplementary Note 10)

The maximum transmission size is a MTU (Maximum Transmission Unit) to the destination communication terminal.

(Supplementary Note 11)

The application data is data generated by at, least one application.

(Supplementary Note 12)

The aggregation data determination unit begins processing at timing when the at least one application data is updated, or at predetermined intervals.

(Supplementary Note 13)

The data aggregation method is a method for generating a new application data by communizing the identifier of the destination terminal and at least one information among application headers which construct the application data by using at least one application data which has the identifier of the destination terminal and at least one information among application headers which construct the application data as common value, and aggregating the application bodies which constructs application data.

The data analysis method corresponding to the data aggregation method is a method for determining a processing method from the application header information constituting the application data which is newly generated through the aggregation, and disaggregating an application body constituting the application data which is newly generated through the aggregation in accordance with a predetermined method.

(Supplementary Note 14)

The predetermined method for disaggregating an application body constituting the application data which is newly generated through the aggregation is a method of disaggregating the application body in unit of a preset data size: a method of disaggregating the application body in accordance with an aggregation method which is written at a predetermined position in the application body; or a method of referring post-aggregation data sizes written in several bytes from a head of the application body, extracting a corresponding data having the data size from the head of the application body, and subsequently, repeating the same operation as described above until there becomes no application body.

(Supplementary Note 15)

The aggregation data determination unit determines a plurality of application data, for each of which transmission order is earlier, from among the extracted application data on the basis of the transmission order information, and generates the aggregated data including the plurality of application data for each of which transmission order is earlier, and the destination information common to the plurality of application data.

This application is based upon and claims the benefit of priority from Japanese patent application No. 2012-130998, filed on Jun. 8, 2012, the disclosure of which is incorporated herein in its entirety by reference.

INDUSTRIAL APPLICABILITY

The present invention can be applied to a communication apparatus which transmits data having a size smaller than a maximum transmission size of a communication network to a different communication apparatus.

REFERENCE SIGNS LIST

100 Communication system
101 First communication terminal.
102 Second communication terminal.
103 Network
201 and 801 Data generation unit group
202 and 802 Transmission timing management unit
203 and 803 Allowable delay information storage unit
204 and 805 Transmission planned data storage unit 205 and 806 Data aggregation unit
206 and 807 Maximum transmission size storage unit
207 and 804 Aggregation policy storage unit
208 and 808 Data transmission unit
501 Data reception unit
502 Data analysis unit
503 Application header analysis method storage unit
504 Application body processing method storage unit
505 Data processing unit group

The invention claimed is:

1. A communication apparatus comprising:
one or more memories storing a plurality of application data each associated with transmission order information indicating a transmission order and destination information indicating a destination terminal as a transmission destination; and
a processing device
extracting a plurality of application data, which are mutually associated with identical destination information, from the stored plurality of application data, extracting a plurality of application data targeted for aggregation from the plurality of extracted application data on the basis of a maximum value of the aggregation appropriateness degree that is a combination of an aggregation efficiency calculated from data sizes and a transmission priority degree calculated from allowable delay times by using weights for each of the aggregation efficiency and the transmission priority degree, and generating aggregated data to which the identical destination information is allocated on the basis of the plurality of application data targeted for aggregation, and
transmitting the aggregated data to a destination terminal indicated by the allocated destination information.

2. The communication apparatus according to claim 1, wherein the processing device extracts the plurality of application data targeted for aggregation in order from an application data whose transmission priority degree is determined to be high on the basis of the transmission order information.

3. The communication apparatus according to claim 1, wherein the processing device comprises:
a plurality of transmission queues comprising:
a first transmission queue which has a first transmission priority level, and
a second transmission queue which has a second transmission priority level lower than the first transmission priority level, and
wherein the processing device accumulates each of the plurality of application data in any one of the plurality of transmission queues in accordance with the transmission priority level information, reads out the application data accumulated in the first transmission queue earlier than the application data accumulated in the second transmission queue, and generates the aggregated data such that a size of the aggregated data is smaller than the maximum transmission size.

4. The communication apparatus according to claim 1, wherein the transmission order information is information representing a priority level of transmission of the associated application data by an allowable delay time.

5. The communication apparatus according to claim 1, wherein the processing device extracts a plurality of combination patterns each including at least one application data which is extracted from the plurality of extracted application data, selects one combination pattern from among the plurality of combination patterns on the basis of a data size of the at least one application data included in each of the plurality of combination patterns, and generates the aggregated data on the basis of a plurality of application data included in the selected combination pattern.

6. The communication apparatus according to claim 4, wherein the processing device extracts a plurality of combination patterns each including at least one application data which is extracted from the plurality of extracted application data, selects one combination pattern from among the plurality of combination patterns on the basis of a data size of the at least one application data included in each of the plurality of combination patterns, and generates the aggregated data on the basis of a plurality of application data included in the selected combination pattern.

7. The communication apparatus according to claim 1, wherein the processing device
extracts a plurality of combination patterns each including at least one application data which is extracted from the plurality of extracted application data;
selects one combination pattern from among the plurality of combination patterns on the basis of a ratio of a data size of the at least one application data included in each of the plurality of combination patterns relative to the maximum transmission size, and the transmission order information of each of the at least one application data included in each of the plurality of combination patterns; and
generates the aggregated data on the basis of a plurality of application data included in the selected combination pattern.

8. A communication method comprising:
referring to a transmission planned data storage unit which stores a plurality of application data each associated with transmission order information indicating a transmission order and destination information indicating a destination terminal as a transmission destination;
extracting a plurality of application data, which are mutually associated with identical destination information, from the plurality of application data stored in the transmission planned data storage unit;
extracting a plurality of application data targeted for aggregation from the plurality of extracted application data on the basis of a maximum value of the aggregation appropriateness degree that is a combination of an aggregation efficiency calculated from data sizes and a transmission priority degree calculated from allowable delay times by using weights for each of the aggregation efficiency and the transmission priority degree;
generating aggregated data to which the identical destination information is allocated on the basis of the plurality of application data targeted for aggregation; and
transmitting the aggregated data to a destination terminal indicated by the allocated destination information.

9. A computer readable non-transitory recording medium embodying a program, said program causing a computer to perform a method, said method comprising:
referring to a transmission planned data storage unit which stores a plurality of application data each associated with transmission order information indicating a transmission order and destination information indicating a destination terminal as a transmission destination;
extracting a plurality of application data, which are mutually associated with identical destination information, from the plurality of application data stored in the transmission planned data storage unit;

extracting a plurality of application data targeted for aggregation from the plurality of extracted application data on the basis of a maximum value of the aggregation appropriateness degree that is a combination of an aggregation efficiency calculated from data sizes and a transmission priority degree calculated from allowable delay times by using weights for each of the aggregation efficiency and the transmission priority degree;

generating aggregated data to which the identical destination information is allocated on the basis of the plurality of application data targeted for aggregation; and transmitting the aggregated data to a destination terminal indicated by the allocated destination information.

10. The communication apparatus according to claim 2, the processing device comprises:
 a plurality of transmission queues comprising:
  a first transmission queue which has a first transmission priority level, and
  a second transmission queue which has a second transmission priority level lower than the first transmission priority level, and
 wherein processing device accumulates each of the plurality of application data in any one of the plurality of transmission queues in accordance with the transmission priority level information, reads out the application data accumulated in the first transmission queue earlier than the application data accumulated in the second transmission queue, and generates the aggregated data such that a size of the aggregated data is smaller than the maximum transmission size.

11. The communication apparatus according to claim 2, wherein the transmission order information is information representing a priority level of transmission of the associated application data by an allowable delay time.

12. The communication apparatus according to claim 3, wherein the transmission order information is information representing a priority level of transmission of the associated application data by an allowable delay time.

13. The communication apparatus according to claim 2, wherein the processing device extracts a plurality of combination patterns each including at least one application data which is extracted from the plurality of extracted application data, selects one combination pattern from among the plurality of combination patterns on the basis of a data size of the at least one application data included in each of the plurality of combination patterns, and generates the aggregated data on the basis of a plurality of application data included in the selected combination pattern.

14. The communication apparatus according to claim 3, wherein the processing device extracts a plurality of combination patterns each including at least one application data which is extracted from the plurality of extracted application data, selects one combination pattern from among the plurality of combination patterns on the basis of a data size of the at least one application data included in each of the plurality of combination patterns, and generates the aggregated data on the basis of a plurality of application data included in the selected combination pattern.

15. The communication apparatus according to claim 4, wherein the processing device extracts a plurality of combination patterns each including at least one application data which is extracted from the plurality of extracted application data, selects one combination pattern from among the plurality of combination patterns on the basis of a data size of the at least one application data included in each of the plurality of combination patterns, and generates the aggregated data on the basis of a plurality of application data included in the selected combination pattern.

16. The communication apparatus according to claim 2, the processing device
 extracts a plurality of combination patterns each including at least one application data which is extracted from the plurality of extracted application data;
 selects one combination pattern from among the plurality of combination patterns on the basis of a ratio of a data size of the at least one application data included in each of the plurality of combination patterns relative to the maximum transmission size, and the transmission order information of each of the at least one application data included in each of the plurality of combination patterns; and
 generates the aggregated data on the basis of a plurality of application data included in the selected combination pattern.

17. The communication apparatus according to claim 3, wherein the processing device
 extracts a plurality of combination patterns each including at least one application data which is extracted from the plurality of extracted application data;
 selects one combination pattern from among the plurality of combination patterns on the basis of a ratio of a data size of the at least one application data included in each of the plurality of combination patterns relative to the maximum transmission size, and the transmission order information of each of the at least one application data included in each of the plurality of combination patterns; and
 generates the aggregated data on the basis of a plurality of application data included in the selected combination pattern.

18. The communication apparatus according to claim 4, wherein the processing device
 extracts a plurality of combination patterns each including at least one application data which is extracted from the plurality of extracted application data;
 selects one combination pattern from among the plurality of combination patterns on the basis of a ratio of a data size of the at least one application data included in each of the plurality of combination patterns relative to the maximum transmission size, and the transmission order information of each of the at least one application data included in each of the plurality of combination patterns; and
 generates the aggregated data on the basis of a plurality of application data included in the selected combination pattern.

19. The communication apparatus according to claim 10, wherein the processing device
 extracts a plurality of combination patterns each including at least one application data which is extracted from the plurality of extracted application data;
 selects one combination pattern from among the plurality of combination patterns on the basis of a ratio of a data size of the at least one application data included in each of the plurality of combination patterns relative to the maximum transmission size, and the transmission order information of each of the at least one application data included in each of the plurality of combination patterns; and
 generates the aggregated data on the basis of a plurality of application data included in the selected combination pattern.

* * * * *